Figure 1:
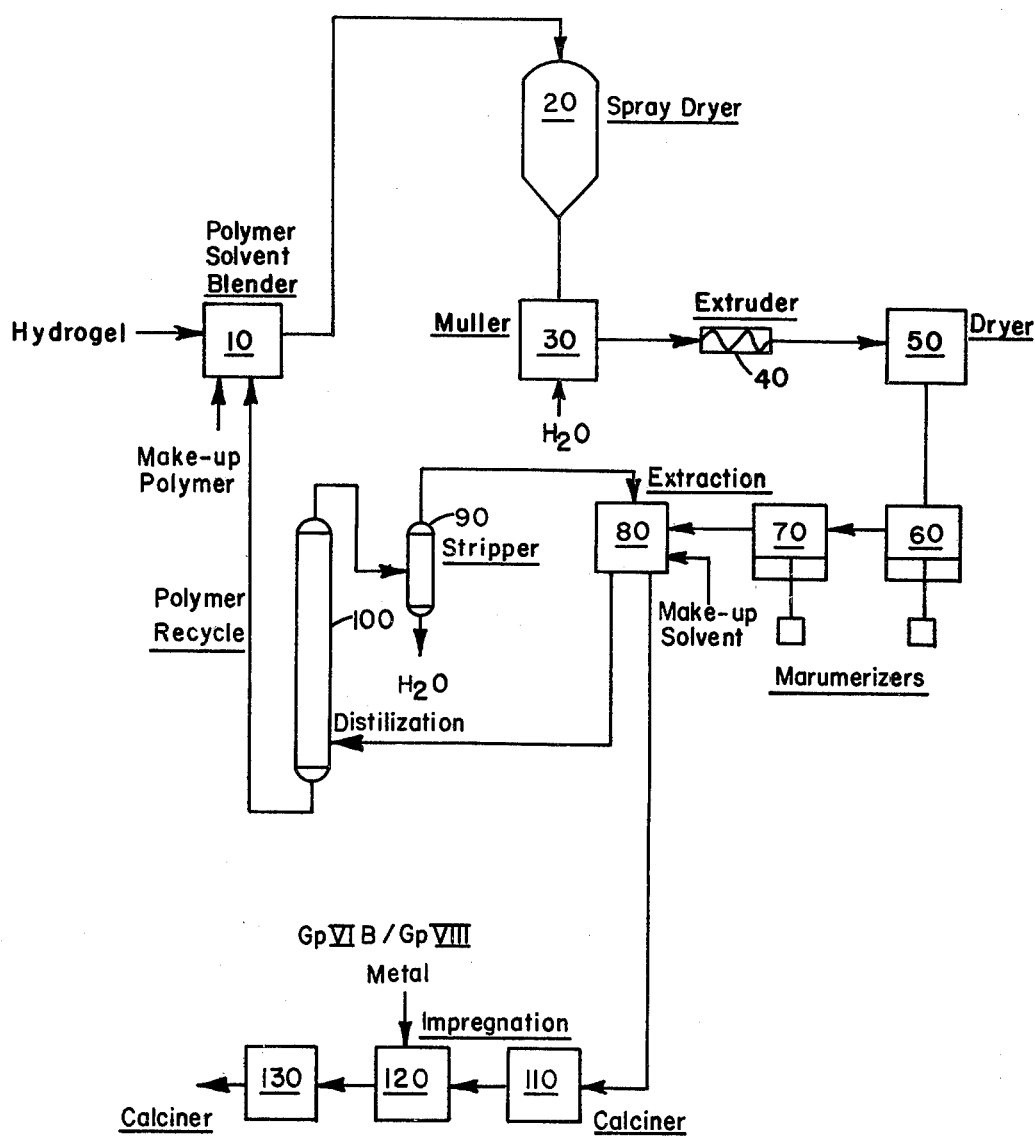

United States Patent [19]

Sawyer et al.

[11] 4,016,107
[45] Apr. 5, 1977

[54] PREPARATION OF CATALYSTS OF PREDETERMINED PORE SIZE DISTRIBUTION AND PORE VOLUME

[75] Inventors: Willard H. Sawyer; Harry E. Robson, both of Baton Rouge, La.

[73] Assignee: Exxon Research and Engineering Company, Linden, N.J.

[22] Filed: Jan. 5, 1976

[21] Appl. No.: 646,491

[52] U.S. Cl. .......................... 252/455 R; 252/465; 252/466 J
[51] Int. Cl.$^2$ ................... B01J 21/04; B01J 21/06; B01J 23/24; B01J 23/74
[58] Field of Search ............... 252/463, 465, 455 R, 252/466 J; 423/628

[56] References Cited
UNITED STATES PATENTS 3,900,427   8/1975   Riley et al. .................... 252/465 X

*Primary Examiner*—W. J. Shine
*Attorney, Agent, or Firm*—L. A. Proctor

[57] ABSTRACT

A process for the formation of a catalyst of predetermined pore size distribution and pore volume from an alumina hydrogel formed and obtained by precipitation from a solution containing a hydrous form of alumina in 1–5 wt. % concentration and an anion that is soluble in an alkaline solution and forms an aluminum salt, at pH 8–12, and temperature ranging about 15° F.–120° F., and then extended by contact with a solution of a water-soluble polymer containing 2 to about 24 monomer units from the group consisting of (a) polyethylene glycols, (b) polypropylene glycols, and (c) polyethylene amines sufficient to absorb the polymer and displace water from the pores until the weight ratio of polymer:alumina ranges about 0.5:1 to about 4:1. A metal hydrogenation component, or components, suitably a Group VI-B or Group VIII metal, or both, can be added during the polymer extending step, if desired, by adding a soluble compound, or salt of the desired metal, or metals, to the polymer containing solution. In either event, the polymer is removed by solvent extraction, dried and calcined to form gamma alumina.

24 Claims, 3 Drawing Figures

RELATIONSHIP BETWEEN EXTRUDATE PARTICLE SIZE DIAMETER AND SPHERE DIAMETER

PREPARATION OF CATALYSTS OF PREDETERMINED PORE SIZE DISTRIBUTION AND PORE VOLUME

Aluminum oxide, or alumina, in various forms has been known for many years. Certain forms of alumina have proven outstanding for use as carriers or supports in forming catalysts; and catalysts formed by compositing various metals, or mixtures of metals, with alumina have been widely used in the petroleum refining industry. Various forms of alumina occur in nature, and many forms have been synthetically produced. The synthetic forms of alumina are usually preferred because they can be prepared in very pure form, at controlled conditions, to provide particular physical characteristics. However, few processes are available for the formation of alumina of preselected, or controlled, large pore size distribution with enlarged pore volume, particularly large pores of narrow pore size distribution with enlarged pore volume.

An established technique for the formation of alumina involves the precipitation of a hydrous form of alumina from solution by adding to an aqueous alkaline aluminate solution a quantity of an inorganic acidic compound having an anion that is soluble in an alkaline solution and forms an aluminum salt. For example, a solution of aluminum oxide trihydrate dissolved in a strong alkali, e.g., NaOH, added to mineral acid or the aluminum salt of a strong mineral acid, e.g., $Al_2(SO_4)_3$, such that at the end point the solution is at pH ranging from about 8 to 12, generally from about 9 to 10, will cause the precipitation of a hydrous form of alumina from solution. The hydrous alumina solids which precipitate are then separated from the slurry generally by filtration, washed and then dried to form a solid powdery or glass-like material. Generally, little consideration is given to the pore size distribution or pore volume of the final alumina product, and generally the total pore volume of such aluminas range below about 0.8 cc/g, most often between about 0.3 and about 0.6 cc/g.

A process of this general type is described in U.S. Pat. No. 3,417,028, but it differs fro other prior art processes in that a wide range of various types of additives is employed for control of pore volume and pore size distribution of the final alumina product. Pursuant to the disclosure, alumina of large pore volume is prepared by the addition of water soluble organic polymers which are either dissolved in the solution used to prepare the gel or dissolved or dispersed with the hydrous mass of gel after it has been precipitated. The water-soluble organic polymers are characterized as polyethylene glycols, polyethylene oxide, methyl cellulose ethers, polyvinyl alcohols, and polyacrylamides, which range from low molecular weight to very high molecular weight materials comprising compounds ranging fro single monomer units to compounds comprised of several hundred monomer units, chiefly the latter. In accordance with this reference, the water-soluble organic polymers are added to the gels generally before the gel has been washed, the gel is dried, and then calcined. The pore size distribution of the final alumina products contains substantial pore volume in pore sizes ranging from about 20A (Angstroms) to 20,000A diameter, and higher. (Refer also to the Jorunal of Catalysis, Vol. I, Pages 547–563 [1962], "The Control of the Pore Volume and Pore Size Distribution in Alumina and Silica Gels by the Addition of Water-Soluble Organic Polymers," by Z. Basmadjian, G. N. Fulford, B. I. Parsons, and D. W. Montgomery.)

Whereas the Patentees' efforts represented an early attempt to devise a method for controlling the pore volume and pore size distribution in alumina, the method nevertheless leaves much to be desired, inter alia, in that most of the pore volume is in the range of 1000A diameter or greater and no procedure is given for concentrating pore volume in a particular range. Moreover, the polymers used as pore volume extenders are consumed in the calcination step and hence, due to the cost of the polymer, the process must be debited. Further, the smoke and fumes produced on burning the polymer during calcination creates additional burdens on the process.

In pending Application Ser. No. 533,314, filed Dec. 16, 1974, which a continuation-in-part of abandoned Application Ser. No. 440,303, filed Feb. 7, 1974, by G. P. Hamner; Application Ser. No. 533,299, filed Dec. 16, 1974, which is a continuation-in-part of abandoned Application Ser. No. 440,285 by W. F. Arey, Jr. et al; Application Ser. No. 533,300, filed Dec. 16, 1974, which is a continuation-in-part of abandoned Application Serial No. 440,290 by W. F. Arey, Jr. et al; Application Ser. No. 533,301, filed Dec. 16, 1974, which is a continuation-in-part of abandoned Application Ser. No. 440,315 by G. P. Hamner; Application Ser. No. 533,311, filed Dec. 16, 1974, which is a continuation-in-part of abandoned Application Ser. No. 440,302 by W. F. Arey, Jr. et al; Application Ser. No. 533,312, filed Dec. 16, 1974, which is a continuation-in-part of abandoned Application Ser. No. 440,316 by W. J. Mattox; Application Ser. No. 533,331, filed Dec. 16, 1974, which is a continuation-in-part of Application Ser. No. 440,301, by W. F. Arey, Jr. et al; and Application Ser. No. 533,313, filed Dec. 16, 1974, which is a continuation-in-part of abandoned Application Ser. No. 440,302 by F. M. Long et al, the disclosures of which are herewith incorporated by reference, a novel method is described for the preparation of catalysts from alumina having properties inclusive of a large number of pores in the 100–275A pore size diameter range, and very high pore volume. These catalysts are particularly useful in the production of clean liquid products by the hydroconversion of the 1050° F.+ materials contained in unconventional heavy crudes and residua, which materials are particularly difficult to treat because they have (1) very high Conradson carbon (i.e., Con carbon) or carbon-hydrogen ratios (i.e., relatively high carbon and low hydrogen content, (2) very high metals content, particularly as regards the amount of nickel and vanadium, (3) they are ultrahigh in their content of materials boiling above 1050° F., e.g., asphaltenes, and (4) contain considerable amounts of sand and scale. The method used in the preparation of the catalysts is based on the neutralization of an alumina salt solution with ethylene oxide at controlled conditions. Whereas this method has been admirably useful in producing such catalysts, further methods for the production of such catalysts are desired.

A primary objective of the present invention, therefore, is to supply this need.

A particular object is to provide a new and improved method for the preparation of catalysts particularly useful in hydrocarbon conversion reactions, especially reactions involving the hydroconversion of the 1050° F.+ hydrocarbon portion of heavy crudes and residua.

A further specific object is to supply a new and improved method for the preparation of catalysts useful in converting the 1050° F.+ hydrocarbon portion of feeds comprising heavy crudes and residua to useful lower boiling products while simultaneously producing appreciable Conradson carbon (Con. carbon) reduction, hydrodesulfurization, hydrodenitrogenation and demetallization of the feeds.

These and other objects are achieved pursuant to the practice of the present invention which comprises a process for the treatment of a hydrogel by contact thereof with an aqueous solution containing from about 10 to about 20 percent, preferably from about 15 to about 20 percent, by weight, of a water soluble polymer containing from about 24, to about 24, preferably from about 4 to about 8 monomer units, from the group consisting of (a) polyethylene glycols, (b) polypropylene glycols, and (c) polyethylene amines. In the treatment the water of the hydrogel is exchanged or replaced by the polymer solution, the treatment being continued with the polymer solution after initial contact sufficient to add polymer to the hydrogel in polymer:alumina concentration ranging from about 0.5:1 to about 4:1, preferably from about 1:1 to about 2:1. Relatively large pore volume and large pore sizes are favored by high polymer:alumina concentrations, and relatively low pore volume, somewhat smaller pore sizes are favored by low polymer:alumina cncentrations. Whereas the mechanism of the reaction is not entirely understood, and there is no desire to be bound by any specific theory, apparently the incorporation of the polymer suppresses contraction of the pores developed within the hydrogel during the necessary catalyst preparation steps.

In a preferred embodiment the process, more specifically, is one involving the following steps:

(1) Alumina, as a hydrogel, is precipitated from an alkaline solution at a pH ranging from about 8 to 12, preferably 9 to 10, by adding to a hydrous form of alumina in aqueous alkaline solution, an inorganic acid or aluminum salt of an inorganic acid constituted in part of an anion soluble in a alkaline medium. The alumina is normally precipitated by combining solutions, (a) a first of which contains an alkali metal aluminate, e.g., $NaAlO_2$, and (b) a second of which contains a strong mineral acid or an alumina salt of a strong mineral acid, the anion portion of which is soluble in an alkaline solution, e.g., $Al_2(SO_4)_3$. Silica can be added, if desired, to ultimately produce a "glassy" alumina or to increase the resistance of the catalyst to sintering. The temperature of precipitation ranges generally from about 15° F. to about 120° F., and preferably from about 32° F. to about 70° F. Suitably, the concentration of alumina contained within the sum-total of the solution ranges from about 1 to about 5 weight percent preferably from about 2 to about 3 weight percent.

A catalytically active amount of a metal hydrogenation component, or metal hydrogenation components, suitably a Group VIB or Group VIII metal (preferably a non-noble metal), or both (Periodic Table of the Elements, E. H, Sargent and Co., copyright 1962 Dyna-Slide Co.), can be incorporated into the hydrogel during the precipitation step, if desired, by the addition of soluble compounds, or salts, of such metals to the solutions before combination. For example, molybdenum can be incorporated into the hydrogel by adding sodium molybdate or molybdic acid to the NaOH-$NaAlO_2$ solution. Tungsten can be incorporated by adding $WO_3$ or $Na_2WO_4$ to this solution. Likewise, cobalt can be incorporated by adding $CoSO_4$ to the $Al_2(SO_4)_3$ solution, or nickel by adding $NiSO_4$.

(2) The precipitated alumina hydrogel, a microcrystalline substance, in a gel matrix, ranging from about 30A to about 40A in crystallite size, is preferably washed with water or aqueous solution, suitably at ambient temperature or temperatures ranging from about 70° F. to about 85° F., to remove essentially all of the soluble salt, e.g., $Na_2SO_4$. The removal of a large part of the sulfate from the alumina hydrogel is essential to achieve high surface area and good catalytic activity in the finished catalyst, and preferably essentially all of the sulfate is removed from the hydrogel.

(3) In a pore volume extending step, a "pore volume extending" agent comprising a water-soluble polymer containing from about 2 to about 24 monomer units, preferably from 4 to about 8 monomer units, from the group consisting of (a) polyethylene glycols, (b) polypropylene glycols, and (c) polyethylene amines is then added to the partially washed hydrogel, suitably during the washing step, or the hydrogel further contacted or washed with a solution of the polymer. In either event, the hydrogel is contacted with an aqueous solution containing from about 10 weight percent to about 20 weight percent, and preferably from about 15 weight percent to about 20 weight percent of the polymer, such that the polymer solution is absorbed into the pores of the hydrogel. Suitably, the hydrogel is contacted or washed at ambient temperature, or at a temperature ranging from about 70° F. to about 85° F.

The final pore volume, and pore volume distribution, of the finished alumina is principally determined by the amount of polymer, or pore volume extender, added to the hydrogel during the pore volume extending step. In contacting or washing the hydrogel, the water within the hydrogel is displaced by polymer solution, and the more concentrated the polymer within the solution the greater the amount thereof which can be exchanged into the hydrogel, Preferably, the water is displaced until the weight ratio of polymer:alumina within the hydrogel ranges from about 0.5:1 to about 4:1, and preferably from about 1:1 to about 2:1. Suitably, the exchange is accomplished by blending the components, stirring and filtering, with repetition of these steps until the hydrogel contains the desired amount of polymer, or by initial filtration of the gel with subsequent washing of the gel with polymer solution while the gel is contained on the filter.

A catalytically active amount of a metal hydrogenation component, or metal hydrogenation components, suitably a Group VIB or Group VII metal (preferably a non-nobel metal), or both (Periodic Table of the Elements, E. H. Sargent and Co., copyright 1962 Dyna-Slide Co.), can be incorporated into the hydrogel during the pore volume extending step, if desired, by the addition of soluble compounds, or salts, of such metals. Molybdenum of Group VIB and cobalt or nickel of Group VIII are preferred metals, particularly an admixture of these metals. Preferably, however, the hydrogenation component, or components, is added subsequent to calcination of the material, as subsequently discussed.

(4) The polymer containing hydrogel is dried, suitably at temperatures ranging from about 85° F. to about 350° F., and preferably from about 212° F. to about 250° F., to form a gel. In this step, the pore structure of the hydrogel is set and the hydrogel converted into boehmite. The boehmite, after drying, exists as a granular substance which can, by proper adjustment of its solids (or liquid) content, be formed into various shapes, e.g., extrudates or spheres, calcined and then impregnated with a hydrogenation component, or components, if not already impregnated with a metal hydrogenation component, or components.

(5.) The dried boehmite can then (a) be calcined at temperatures ranging from about 570° F. to about 1110° F., or higher, preferably from about 840° F. to about 1020° F., at which time the added polymer is decomposed and evolved, or removed as gases and smoke, or preferably (b) contacted with a low molecular weight water soluble solvent at temperatures ranging from about 140° F. to about 285° F., preferably from about 175° F. to about 230° F., to remove the polymer, and then calcined. After calcination, which converts the boehmite to gamma alumina, a metal hydrogenation component, or components, can be added to the gamma alumina base by impregnation, if the hydrogenation component, or components, has not already been added during the gelling step or the pore volume extending step, supra.

Spherical shaped catalysts have been found particularly useful in the hydroprocessing of unconventional whole heavy crudes and residua, particularly spherical catalysts ranging from about 1/50 to about ⅛ inch, preferably from about 1/32 to about 1/8 inch, and more preferably from about 1/32 to about 1/16 inch particle size diameter. Pursuant to the practice of this invention, catalysts in the shape of very smooth hard spheres can be formed. These catalysts are particularly useful as fixed beds in hydroprocessing processes, largely because of the uniformity and roundness of the particles which considerably reduce pressure drop as contrasted with the use of catalyst spheres of more irregular shape which tend to pack more closely together. The catalysts are also especially suitable for use in fluidized or ebullating beds. The diffusion limitations concomitant to the hydroprocessing of the high metals content whole heavy crudes and residua are largely overcome, pore blockage is suppressed, and there is a significant beneficant beneficial effect in the ability of the smaller particle size catalyst to desulfurize, demetallized, and denitorgenate such feeds. High concentrations of the metals, notably nickel and vanadium, are removed from such feeds during the hydroconversion reaction, and yet good catalyst activity maintenance is achieved. A high rate of hydrodesulfurization is attained. Catalysts, formed as extrudates, also prove very useful in the hydroprocessing of these unconventional whole heavy crudes and residua.

In all of the catalysts of this invention, there is a definite relation between particle size and pore size. The catalysts of this invention include a combination of properties, comprising, when the catalyst is of size ranging from about 1/50 inch up to 1/25 inch average particle size diameter, at least about 15 percent, preferably at least about 20 percent, and more preferably at least about 45 percent, of its total pore volume of absolute diameter within the range of about 150A to about 250A; when the catalyst is of size ranging from about 1/25 inch to about ⅛ inch average particle size diameter, at least about 15 percent, preferably at least about 20 percent, and more preferably at least about 30 percent, of its total pore volume of absolute diameter within the range of about 175A to about 275A; wherein, in each of these catalysts of differing of particle size distributions, the pore volumes resultant from pores of 50A, and smaller, i.e., 50A—, are minimized; and preferably, in the catalysts of average particle size above 1/50 inch, the pore volume resultant from pores above 350A, i.e., 350A+, is minimized; the surface areas and pore volumes of the catalysts being interrelated with particle size, and pore size distributions, surface areas ranging at least about 200 m²/g to about 600 m²/g, and preferably at least about 250 m²/g, to about 450 m²/g, with pore volumes ranging from about 0.8 to about 3.0 cc/g, and preferably from about 1.1 to about 2.3 cc/g (B.E.T.).

In their optimum forms, the absolute pore size diameter of the catalyst, dependent on particle, size, is maximized within the 150–250A, and 175–275A ranges, respectively. It is not practical, of course, to eliminate the presence of all pores of sizes which do not fall within these ranges, but in accordance with this invention, it is practical to produce catalyst particles, inclusive of those of spherical shape, having absolute pore size diameters highly concentrated within these desired ranges. The following tabulations show the pore size distributions, as percent of total pore volume, of marginal and preferred catalysts of this invention:

| Distribution of Pore Diameters[1] | Marginal | Preferred | More Prefered |
|---|---|---|---|
| 1/50 up to 1/25″[2] | | | |
| 0–50A | <10% | <5% | <1% |
| 150–250A | >15% | >20% | >45% |
| 350A+ | <35% | <30% | <7% |
| Pore Volume, cc/g | 1.1–1.7 | 1.3–1.9 | 1.5–2.1 |
| Surface Area, m²/g | 320–475 | 340–575 | 360–600 |
| 1/25 up to 1/8″[2] | | | |
| 0–50A | <5% | <4% | <3% |
| 175–275A | >15% | >20% | >30% |
| 350A+ | <40% | <35% | <25% |
| Pore Volume, cc/g | 1.3–1.9 | 1.5–2.1 | 1.8–2.3 |
| Surface Area, m²/g | 340–500 | 350–600 | 370–650 |

[1]Measured by nitrogen adsorption isotherm, wherein nitrogen adsorbed is at various pressures. Technique described in Ballou et al, Analytical Chemistry, vol. 32, April, 1960, using Aminco Adsorptomat [(Catalogue No. 4-4680) and Multiple Sample Accessory (Catalogue No. 4-4685) Instruction No. 861-A] which uses the principle of adsorption and desorption of gas by a catalyst specimen at the boiling point of nitrogen.
[2]Average particle diameter in inches.

These and other features of the invention will be better understood by reference to the attached drawings, and to the following detailed description of a highly preferred process for the preparation of spherical catalysts in accordance with this invention. In the description, specific reference is made to the drawings.

In the drawings:

FIG. 1 schematically depicts a preferred flow plan, starting with the blending of the hydrogel and the polymer containing solvent and ending with the finished catalyst.

Figure 2:
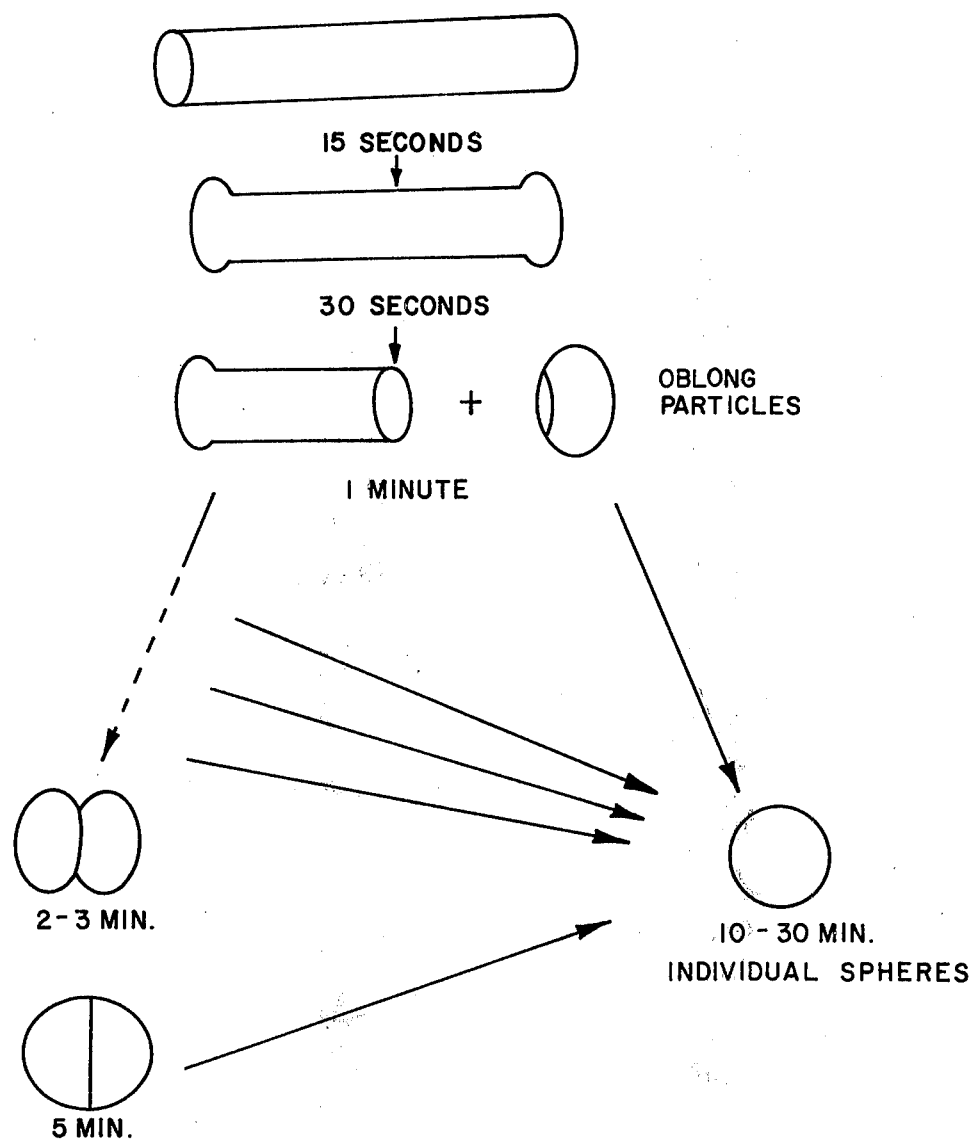

FIG. 2 schematically depicts the formation of spheres from extrudates, or cylindrical shaped boehmite paste of critical solids content.

Figure 3:
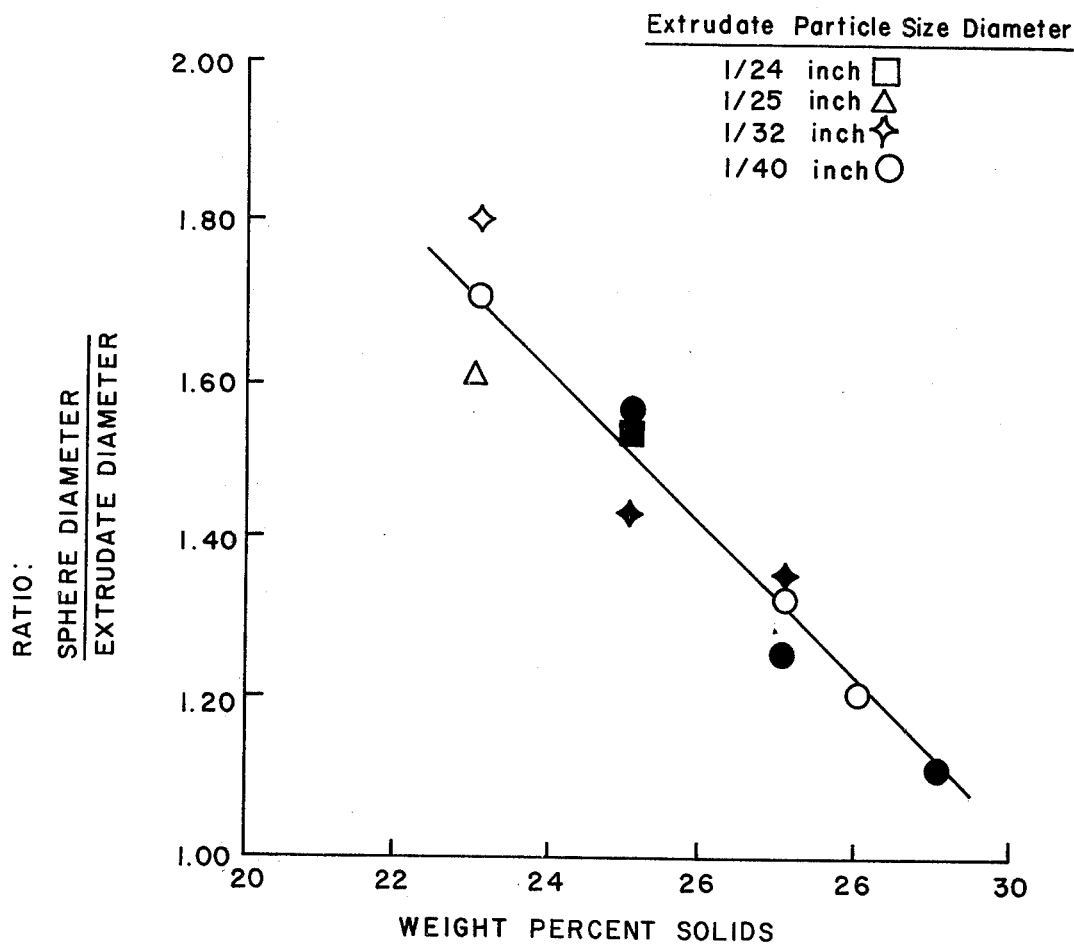

FIG. 3 graphically depicts the relationship between sphere diameter and extrudate diameter as a function of solids content in the formation of spheres from extrudates of critical solids content.

Referring generally to FIG. 1 for an overview of the process, there is depicted a flow plan suitable for use in the formation of alumina extrudates or spheres comprising the combination of a blender 10 wherein a previously washed, moist alumina hydrogel, as formed in Steps 1 and 2, supra, is blended with makeup polymer and recycle polymer for displacement of water and incorporation of polymer within the hydrogel, as in Step 3, supra; a spray drier 20 wherein the hydrogel is reduced to microspherical form, the pore size set and the hydrogel converted to essentially boehmite; a muller 30 wherein water is added to the microspherical boehmite to physically convert the latter to a paste of extrudable consistency; an extruder 40 wherein the granulated boehmite is extruded through an aperture or die; and, an extrudate drier 50. For use in the formation of spheres (which are formed from extrudates) there is also provided a series of marumerizers 60,70 wherein the extrudates are broken, fragmented and formed into spheres. Extrudates from drier 50, or spheres from the marumerizers 60,70, are passed to an extraction stage, or extractor 80, wherein the polymer is separated from the extrudates or spheres, and the solvent and polymer are recovered. In the extraction of the solvent and polymer, the extrudates from drier 50, or spheres from the series of marumerizers 60,70, are initially contacted with fresh or recycle solvent from the stripping column 90, and the used solvent and microspherical boehmite then separated one from the other. The used solvent is then passed to distillation column 100 wherein polymer is recovered from the bottom of the column and recycled to the blender 10. Overhead from the distillation column 100, principally solvent and water are then passed to stripper 90 wherein solvent is removed from the stripper 90 and passed to the extractor 80, and water is also rejected from the stripper. (In some instances it may also be desirable to extract polymer from the dried solids prior to the formation of spheres or extrudates. In such case the product from blender 10 is dried in spray drier 20, or a low temperature drier. The dried product is then contacted in extractor 80, and the extracted product recycled to muller 30 for treatment in the sequence of steps described. Product from the marumerizer 70 would then be dried, and directed to calciner 110.) The recovered granulated boehmite solids from extractor 80 are passed to a first calciner 110 wherein the boehmite is converted to gamma alumina.

Gamma alumina from calciner 110, in the more preferred embodiment, is then impregnated in impregnation stage 120, with the desired Group VIB or Group VIII metal, or preferably an admixture of Group VIB and Group VIII metals, and then dried and further calcined as in the second calciner 130, from where the finished catalyst is removed.

Within the blender 10, a solution of the desired water soluble polymer is blended with sufficient of a recycle stream from the distillation column 100 to displce water and add polymer to the alumina hydrogel in polymer:alumina ratios ranging from about 0.5:1 to about 4:1, preferably from about 1:1 to about 2:1, based on weight, at generally ambient temperature and pressure, suitably at temperatures ranging from about 70° F. to about 85° F. Makeup polymer can be added, if required. The hydrogel is removed from the blender 10 as a slurry, suitably a pumpable slurry and, if necessary, excess water-polymer solution or water is added for such purpose.

In some instances, as suggested, it may be desirable to add the catalytic metals during this blending step by impregnation of the hydrogel. It is desirable during hydrogel impregnation that the pH of the blend be maintained in excess of 10 to avoid unwanted precipitation of the catalytic metals. A catalytically active amount of the metal hydrogenation component, or components, suitably a Group VIB or Group VIII metal (preferably a non-noble metal) or both, can be incorporated into the hydrogel. Compounds of cobalt or nickel, including the halide, nitrate, acetate, or the like, can be utilized. To avoid excessive pore volume loss, however, it is preferred that the halide not be used. Compounds of molybdenum or tungsten, including the ammonium salts (e.g., ammonium molybdate) and photphomolybdic acid (or phosphotungstic acid) and the like can be used. The compounds should be mutually water-soluble at pH <10 to avoid undesired precipitation. With this type of impregnation, it is desirable to dry the hydrogel at low temperature (150°–250° F.) especially to avoid breakdown of the polymer. This material can be then extracted with a water-soluble organic material (e.g., alcohols). In this case, it is preferred to use a $C_4$ or higher alcohol to avoid extraction of the catalytic metals. Further treatment of the catalyst involves forming (e.g., extrusion and marumerization) followed by calcination.

Spray drier 20 is employed to convert the hydrogel to boehmite, and form the required pore structure. Suitably, the hydrogel is spray dried, i.e., dried by countercurrent contact of an atomized hydrogel spray with air, at air temperatures ranging from about 250° F. to about 350° F., and preferably at temperatures ranging from about 275° F. to about 300° F. Relatively low temperatures are desirable to minimize oxidation, and to avoid decomposition and loss of polymer. The temperature of the hydrogel or boehmite per se is maintained below about 250° F., and preferably from about 225° F. to about 250° F. to about 250° F. Pressures are not critical, and generally atmospheric or near atmospheric pressure is employed. The spray drier per se is conventional, nozzles of various commercial types being suitable for ejection of the hydrogel paste or slurry as a spray. On egress of the granulated boehmite from the spray drier 20 the microspherical solids range in average particle size diameter from about 75 to about 125 microns. Generally, the spray dried material contains from about 30 to about 35 weight percent alumina, from about 30 to about 60 weight percent polymer, and from about 5 to about 40 weight percent water.

Generally, the spray drying step removes too much moisture from the granules and therefore it is necessary to add a liquid, suitably water, to form an extrudable homogeneous paste. This is accomplished within the muller 30. The solids content of the paste leaving the muller 30 is critical, and hence the amount of water added is somewhat critical. If, on the one hand, too much water is added, it is impractical to extrude the material because it becomes too sticky, and beyond this point it becomes impossible to form an extrudable solids phase. On the other hand, if too little water is present, the material cannot be extruded without significant loss of pore volume, and degradation of the pore size distribution. To avoid excessive pore volume loss, it is desired to minimize the water content of the extrusion paste to approximately 50–60% which corresponds to >20 weight percent solids, preferably >22 weight percent solids, albeit added water facilitates the expression of the paste through the die apertures. On the other hand, however, torque increases exponentially as the solids content of the paste is increased above about 25 weight percent, which also tends to decrease pore volume.

The solids content of the paste is regulated within the muller 30 for reasons stated, but to some degree the solids content is regulated to produce the desired particle size of the spheres. In general, the relation between the solids content of the paste, the required extrudate diameter, and the average spherical particle size diameter is as follows:

| Solids Content of the Paste, Wt. % | Required Extrudate, Diameter, Inches | Average Sphere Size Diameter, Inches |
|---|---|---|
| 26–28 | 1/55–1/28 | 1/50–1/25 |
| 24–26 | 1/32–1/21 | 1/25–1/16 |
| 22–24 | 1/24–1/12 | 1/16–1/8 |

As will be discussed later in reference to forming spheres from extrudates (FIG. 3), several factors are important for forming extrudates. First, the smallest extrudates that can be formed without excessive torque and concomitant crushing of the pores is about 1/40–155 inch. Thus, to form 1/50–1/25 inch spheres it is necessary to have a minimum increase of sphere diameter compared to extrudate diameter. This requires that the spheres be formed at high weight % solids (e.g., 28–30%). The optimum change in weight on drying of extrudates is 2–3 Wt. % which means that the extrudate must be formed from paste containing 26–28% solids. In addition, 1/58–1/28 inch dies must be used to form the 1/25–150 inch spheres. In forming 1/25–1/16 inch spheres it is desirable to increase the extrudate size to 1/32–1/16 inch to minimize torque and pore crushing. As shown by reference to FIG. 3, it is apparent that the weight % solids in the extrusion paste shall be 24–26%. Finally, to form 1/16–1/8 inch spheres it is necessary to use pastes containing 22–24 Wt. % solids. It is undesirable to use pastes of solids content significantly below this level since the extrudates that are formed will have poor crush strength. Thus, at this level, FIG. 3 indicates that 1/24–1/12 inch extrudate will be required for making 1/16–1/8 inch spheres.

The paste from the muller 30, containing the desired amount of solids, is conveyed as a substantially homogeneous mass to the extruder 40 for formation of the paste into extrudates. In forming extrudates, the boehmite paste is extruded through a die, suitably one having a plurality of apertures to form "spaghetti," or spaghetti-like shapes. Excessive torque must be avoided in the extrusion to avoid loss of pore volume and degradation of the pore size distribution by distortion or crushing of the pores. The smaller the die apertures the greater, of course, the force required to effect the extrusion and, whereas the reduction of the solids content of the paste (by water addition at the muller 30) lessens the amount of force that must be applied, there is, as stated, a limit on the amount of water that can be added (or solids reduced) because excessive water also causes loss of pore volume and pore size distribution during extrusion as well as loss of crush strength. In general, with conventional extrusion equipment, e.g., a low torque extruder, Model 0.810 Research Extruder manufactured by Welding Engineers of King of Prussia, Pennsylvania, extrudates of outstanding quality of cross-sectional diameters ranging from about 1/40 to 1/16 inch have been produced.

The cross-sectional diameter of the extrudate is preselected to provide an extrudate of the desired diameter, or the desired sphere sizes, a sphere being of somewhat larger particle size diameter, generally from about 10 percent to about 50 percent larger than the diameter of the extrudate from which it is produced. The difference between sphere diameter and extrudate diameter is primarily dependent upon the weight percent solids of the paste from which the extrudate is formed, which relationship will be better understood by a consideration of the mechanism involved in the formation of spheres from extrudates, subsequently discussed.

Extrudates are next dried in drier 50, suitably a circulating air oven, at temperature ranging from about 150° F. to about 300° F., preferably from about 175° F. at residence time sufficient to form extrudates of critical solids content above about 20 weight percent, suitably with a range of from about 20 to about 30 weight percent, preferably within a range of from about 22 to about 30 weight percent, and more preferably from about 25 to about 28 weight percent.

In the formation of spheres, where spheres are the desired catalyst form, the extrudates, of critical solids content, are next fed batchwise or continuously, preferably the latter, to a series of two or more marumerizers 60,70. The first marumerizer 60 of the series is provided with a rotatable roughened plate suitably of grid design for breaking up the extrudates which initially form into "dumbbell" shapes, which gradually and progressively separate into spheres, and the second marumerizer 70 is provided with a smooth rotatable plate for smoothing the surface of the performed spheres. Suitable marumerizers for such purpose are available commercially, e.g., a Q-230 model made by Eli Lily. A suitable grid is one described as 1.5 mm. friction plate as described in the Marumerizer and Extruding Equipment Operating Manual published by Equipment Sales Dept., Elanco Products Co. of Indianapolis, Indiana, and a suitable smooth plate is one characterized as a polishing plate described in the same publication.

In the operation of marumerizers 60,70 dry spaghetti-like extrudates are dropped onto the revolving grid plate of marumerizer 60, and after a suitable residence time the spheres are passed into marumerizer 70 to finish the formation of the spheres. The function of the marumerizers 60,70 is illustrated by reference to FIG. 2 which shows schematically the progression of an extrudate segment formed into spheres. The time required for marumerization is a direction function of the solids content of the extrudate, the speed of rotation of the plates of the marumerizers 60,70 and type of plates used. Typically, the time required for marumerization ranges from about 10 minutes to about one-half hour. In the figure there is depicted a typical formation of spheres from a single fragment of extrudate, over a typical time period from the initial time that an extrudate has been introduced into the series of marumerizers 60,70. Initially, an extrudate is broken into a plurality of segments having length:diameter ratios ranging from about 8:1 to about 10:1. Within, e.g., about 15 seconds a first dumbbell shape is formed from a segment, and after about 30 seconds one or more of the ends of the dumbbell are broken off and formed into spheres. The process is continued until finally a short dumbbell segment, or double sphere, is formed into a single sphere which generally occurs within from about 2 to about 5 minutes. Generally, from about 6 to about 8 spheres are formed from an original extrudate segment. The spheres are somewhat irregular in shape when contacted with the plate of marumerizer 60, but are rounded off to become smooth, uniform spheres in marumerizer 70 where they are buffed upon the smooth plate.

The size of the spheres formed is a function of the extrudate diameter and the weight percent solids. Referring to FIG. 3, there is graphically depicted the relationship between several extrudates of solids content ranging from about 20 to 30 weight percent, and of extrudate sizes ranging 1/24 inch, 1/25 inch, 1/32 inch and 1/40 inch particle size diameter (die size), respectively, marumerized at 970 rpm until spherical. The ratio of the sphere diameter-extrudate diameter is plotted on the y-axis, and weight percent solids of the paste used to form the extrudate is plotted on the x-axis for each of the several specimens. It will be observed that as the weight percent of solids of the paste is increased, the sphere diameter approaches the extrudate diameter.

The spheres, or extrudates, from drier 50 (where the extrudate catalyst form is desired) are contacted in the extraction zone, or extractor 80, with fresh solvent to extract the polymer. The extraction can be done batchwise or continuously, preferably continuously. Extraction is suitably accomplished in a preferred embodiment by use of a moving bed extractor wherein the solids are introduced into the top of a column, and hot solvent is introduced into the bottom of the column. Suitably, the fresh solvent is introduced at temperature ranging from about 140° F. to about 285° F., or preferably from about 175° F. to about 230° F. Preferably, the solvent is introduced at a temperature just below, or at its boiling point. Hot solvent is removed from the top of the column, and the extracted boehmite solids are removed from the bottom of the column.

In any event, as schematically depicted in FIG. 1, the polymer containing solvent is passed into a distillation column 100, a polymer or polymer concentrate being separated and removed from the bottom of the column 100 and recycled to the blender 10. A solvent and water mixture, taken from the overhead of column 100, is passed to a stripper 90 for removal of water, and the dehydrated polymer-denuded solvent is recycled to extractor 80.

Various solvents are suitable for the extraction of the polymer and water from the boehmite spheres. The solvent employed is one which is soluble in water, and which is capable of dissolving the polymer from the spheres. It is also desirable that the solvent be one which can be desiccated, or one from which the water can be easily stripped. Suitably, also, it is one which boils within a range of from about 140° F. to about 285° F., preferably from about 175° F. to about 230° F. Low molecular weight alcohols are a particularly preferred class of solvents, preferably those which contain from 1 to about 6 carbon atoms, more preferably from about 3 to about 5 carbon atoms, in the total molecule. The monhydric alcohols are preferred. Other solvents which may be employed are ethers, aldehydes, ketones, halogenated hydrocarbons, e.g., chlorinated hydrocarbons, and the like, generally within about the same molecular weight range as the alcohols. In extraction with the low molecular weight alcohols, e.g., methanol, ethanol, isopropanol, n-propanol, 1-butanol, amyl alcohol and the like, generally from about 70 to about 95 weight percent of the polymer is recovered.

The spheres, or extrudates, on egress from the extractor 80 are dried to remove the solvent, suitably at ambient temperatures or at temperatures ranging from about 100° F. to about 200° F., preferably from about 125° F. to about 175° F. Suitably, the spheres, or extrudates, are dried in circulating air, in vacuum, microwave oven, or the like, at least for a time sufficient to remove surface liquid.

The surface dried spheres, or extrudates, are then calcined as in a first calciner 110 to convert the boehmite to gamma alumina. In the calcination, it is required to raise the temperature of the dried spheres to at least about 1000° F. in an atmosphere of nitrogen or other nonreactive medium, but preferably the calcination is conducted in an atmosphere of air. If air is not employed initially, then a terminal step must be employed wherein the catalyst is heated in air at a temperature of at least about 1000° F., preferably from about 1200° F. to about 1400° F. It is found that gamma alumina is readily formed by raising the temperature from ambient to about 1000° F., or higher, at a rate in excess of about 2° F./minute, preferably from about 3° F./minute to about 5° F./minute. After calcination temperature is reached, the temperature is maintained for periods ranging from about 10 minutes to about 6 hours, from about 2 to about 4 hours being typical, preferably the alumina being calcined in air for the entire period.

The gamma alumina sphere, or extrudate, if a metal hydrogenaton component, or components, has not already been added during precipitation or in the blender 10, is next composited with a metal hydrogenation component, or components, e.g., as by impregnation within an impregnation stage 120, or series of such stages. The finished catalyst is thus comprised of a composite of a refractory inorganic support material, preferably a porous inorganic oxide support with a metal or compound of a metal, or metals, selected from Group VIB or Group VIII, or both, the metals generally existing as oxides, sulfides, reduced forms of the metal or as mixtures of these and other forms. Suitably, the composition of the catalysts comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB and one of said Group VIII metals, admixed one with the other and inclusive of third metal components of Groups VIB, VIII and other metals. Preferred catalysts are constituted of an admixture of cobalt and molybdenum, but in some cases the preferred catalysts may be comprised of nickel and molybdenum. The nickel-molybdenum catalyst possesses very high hydrogenation activity and is particularly effective in reducing Con. carbon. Other suitable Group VIB and VIII metals include, for example, chromium, platinum, palladium, iridium, osmium, ruthenium, rhodium, and the like. The inorganic oxide support is preferably stabilized with silica in concentration ranging from about 0.1 to about 20 percent, preferably from about 10 to about 20 percent, based on the total weight (dry basis) alumina-silica composition (inclusive of metal components).

Particularly preferred catalysts are composites of nickel or cobalt oxide with molybdenum, used in the following approximate proportions: from about 1 to about 12 weight percent, preferably from about 4 to about 8 weight percent of nickel or cobalt oxides; and from about 5 to about 50 weight percent, perferably from about 15 to about 25 weight percent of molybdenum oxide on a suitable alumina support. A particularly preferred support comprises alumina containing from about 10 to about 20 percent silica. The catalyst is sulfided to form the most active species.

The Group VIB and Group VIII metal components, admixed one component with the other or with a third or greater number of metal components, can be composited or intimately associated with the porous inorganic oxide support or carrier suitably in impregnation zone 120 by impregnation of the spport with metals, e.g., with the alumina, by an "incipient wetness" technique, or technique wherein a metal, or metals, is contained in a solution, preferably alcohol, in measured amount and the entire solution is absorbed into the support and subsequently dried and calcined to form the catalyst. The amount of solution to be employed in such recipe (measured in cubic centimeters, cc) can be determined quite closely by multiplying the pore volume (PV) of the support to be impregnated by the weight of the support, which product is then multiplied by a factor of 1.6. In this case, the preferred solvent is methanol. Other solvents, such as water, isopropanol and the like, can be used.

A more preferred method of impregnation, however, requires about three times (3X) the volume of solution as required for impregnation by the incipient wetness technique. by a threefold increase in the volume of solution used for the impregnation, more time is allowed for the diffusion of the metals into the pores. Better dispersion of the metals throughout the catalyst is obtained, and there is far less "capping off" or closure of the pores by metal deposits formed at pore entrances.

The metal impregnated support is then again dried, e.g., at temperatures ranging from about 150° F. to about 300° F., preferably from about 175° F. to about 225° F. as in circulating air, vacuum oven, microwave oven, or the like, and again calcined as in calciner 130. Suitably, the calcination is conducted at temperatures ranging above about 1000° F., preferably from about 1200° F. to about 1400° F. in air. The catalysts thus formed are particularly suitable for use in hydroconversion processes as fixed beds and ebullating beds, but can be used in slurry form. When used in the form of fixed beds, the particle size diameter of the catalysts generally ranges from about 1/32 to about ⅛ inch, preferably about 1/16 inch. When used as ebullating beds, the catalyst generally range about 1/32 inch diameter and smaller. The bulk density of the catalyst generally ranges from about 0.2 to about 0.6 g/cc, preferably from about 0.2 to about 0.5 g/cc, depending on particle size.

The invention will be more fully understood by reference to the following selected nonlimiting examples and comparative data which illustrate it more salient features. All parts are given in terms of weight units except as otherwise specified.

The data given in Example 1, below illustrates the importance of precipitating the hydrogel at low temperature to provide pore volume of about 0.8 cc/gm, and greater, with the major portion of the pores in the 100–274A pore diameter range, using polymer extension to maintain such pore size distribution.

EXAMPLE 1

A solution of 54.4 g. NaOH in 53.3 g. water was prepared and heated to 212° F. To this solution was added 40.8 g. alumina trihydrate (Alcoa C-33 alumina). After the alumina dissolved, the solution was diluted with 2667 g. cold water and temperature adjusted to 50° F. A second solution of 160 g. $Al_2(SO_4)_3 \cdot 14 H_2O$ in 1333 g. water was prepared. Just before combination with the sodium alumina solution, 4.9 g. tetraethyl orthosilicate was added to the alumina sulfate solution. Solution No. 2 was added to solution No. 1 at about 50 cc/min with good mixing keeping the temperature of the mixture at 50° F. Addition of solution No. 2 was stopped when pH of the mixture decreased to 10, about 1300 g. of solution No. 2 being required. The mixture was filtered, the hydrogel cake reslurried in water and refiltered twice to remove $Na_2SO_4$, and the washed hydrogel divided into three portions. These portions were blended with various amounts of polyethylene glycol (PEG: 285–315 mol. wt.), dried at ambient temperature, then dried at 248° F. The material was broken into granules of 0.2 inch diameter or less and calcined at 1000° F. to form gamma alumina. The several portions of alumina were then analyzed to determine surface area (SA) in $m^2/gm$, pore volume (PV) in cc/gm, and the pore volume in pore size diameters ranging (a) 100–275A and (b) >1000A, respectively.

The above preparation was repeated holding the temperature of the sodium alumina solution No. 1 during combination at 14°, 32°, 77°, 122°, and 167° F. instead of 50° F. as described above. For the preparation at 14°, 15% methanol/85% water was used to dilute the sodium aluminate to avoid freezing. The results are tabulated in Table I as follows:

TABLE I

EFFECT OF TEMPERATURE OF PRECIPITATION

| Temp. ° F. | Weight Ratio Polymer: $Al_2O_3$ | Surface Area ($m^2/g$) | Pore Volume (cc/g) | Pore Vol.[1] 100–275A dia. | Pore Vol.[1] >1000A dia. |
|---|---|---|---|---|---|
| 14 | 1.0:1 | 332 | 0.89 | 0.234 | 0.019 |
| 14 | 1.5:1 | 355 | 1.40 | 0.412 | 0.047 |
| 14 | 2.0:1 | 362 | 1.75 | 0.278 | 0.060 |
| 32 | 1.0:1 | 408 | 1.05 | 0.262 | 0.021 |
| 32 | 1.5:1 | 428 | 1.44 | 0.522 | 0.037 |
| 32 | 2.0:1 | 418 | 1.74 | 0.542 | 0.092 |
| 50 | 1.0:1 | 409 | 1.11 | 0.221 | 0.175 |
| 50 | 1.5:1 | 428 | 1.50 | 0.503 | 0.214 |
| 50 | 2.0:1 | 410 | 1.87 | 0.594 | 0.289 |
| 77 | None | 290 | 0.45 | 0.014 | 0.012 |
| 77 | 1.0:1 | 403 | 1.34 | 0.159 | 0.010 |
| 77 | 2.0:1 | 433 | 1.74 | 0.607 | 0.046 |
| 122 | None | 329 | 1.43 | 0.198 | 1.627 |
| 122 | 1.0:1 | 384 | 1.86 | 0.263 | 1.871 |
| 122 | 2.0:1 | 377 | 1.83 | 0.258 | 1.991 |
| 167 | None | 323 | 1.49 | 0.228 | 0.904 |
| 167 | 1.0:1 | 372 | 1.52 | 0.288 | 1.026 |
| 167 | 2.0:1 | 372 | 1.47 | 0.272 | 1.289 |

[1]Pore volume as measured by mercury injection.

The data show that the surface areas of all of these products are nearly the same, but pore volume is substantially increased for hydrogels precipitated at elevated temperature, both with and without polymer addition. However, the porosity of the products produced at elevated temperature is primarily caused by pore sizes above 1000A diameter. Only the combination of low temperature precipitation with polymer extension gives an increase in pore volume in the 100–275A diameter range, with pore volume of 0.8 cc/g, and greater.

The following data, presented in Example 2, are illustrative of the effect on pore volume of varying amounts of water soluble polymer added to the hydrogel during the extension step.

EXAMPLE 2

An alumina hydrogel was prepared by combining sodium aluminate and aluminum sulfate solutions at 77° F. similar to Example 1 but without ethyl orthosilicate. The washed hydrogel was divided into five portions and blended with various amounts of polyethylene glycol (380–420 mol. wt.) and dried as described in the preceeding example. The effects of different polymer levels on pore structure measured after calcination in air at 1000° F. are shown in Table II, below:

TABLE II

EFFECT OF INCREASING POLYMER CONTENT OF HYDROGEL

| Polymer/ Alumina | Surface Area (m²/g) | Pore Volume (cc/g) | P.V.[1] 100–275A dia. | P.V.[1] >1000A dia. |
|---|---|---|---|---|
| 0 | 298 | 0.41 | 0.002 | 0.004 |
| 0.5 | 323 | 0.60 | 0.102 | 0.026 |
| 1.0 | 332 | 0.92 | 0.221 | 0.048 |
| 2.0 | 335 | 1.16 | 0.366 | 0.043 |
| 4.0 | 344 | 1.55 | 0.333 | 0.209 |

[1]Pore volume as measured by mercury injection.

These data show little increase in surface area with increasing polymer content of the hydrogel but steadily increasing total pore volume with each increment of polymer. However, the pore volume in the preferred range (100–275A diameter) increases as polymer increases from 0 to 2 g. polymer/g. $Al_2O_3$ but then decreases with additional polymer. On the other hand, the less desirable pore volume greater than 1000A diameter remains low in the range of 0–2g/g. but increases rapidly for 4 g/g.

The following selected data illustrate the effect on pore structure of the molecular weight of the polymer used as the extender.

EXAMPLE 3

An alumina hydrogel was prepared by adding aluminum sulfate solution to sodium aluminate solution at 77° F. as described in Example 1. The washed hydrogel was divided into ten portions and each portion blended with 2 g. of polyethylene glycol (of varying molecular weight) per gram of $Al_2O_3$ content. The samples were dried, calcined, and analyzed as described in Example 1. The results of these runs are given in Table III, below:

TABLE III

EFFECT OF MOLECULAR WEIGHT OF ADDITIVE

| Additive Mol. Wt. | Surface Area (m²/g) | Pore Volume (cc/g) | P.V.[1] 100–275A dia. | P.V.[1] >1000A dia. |
|---|---|---|---|---|
| 62 | 450 | 0.93 | 0.050 | 0.011 |
| 106 | 432 | 1.25 | 0.434 | 0.021 |
| 150 | 424 | 1.34 | 0.427 | 0.044 |
| 194 | 419 | 1.33 | 0.467 | 0.019 |
| 285–315 | 441 | 1.46 | 0.506 | 0.028 |
| 380–420 | 425 | 1.37 | 0.441 | 0.028 |
| 570–630 | 420 | 1.31 | 0.419 | 0.024 |
| 950–1050 | 417 | 1.35 | 0.416 | 0.026 |
| 1300–1600 | 434 | 1.42 | 0.429 | 0.020 |
| 3000–3700 | 411 | 1.26 | 0.419 | 0.084 |

[1]Pore volume as measured by mercury injection.

Ethylene glycol (monomer) shows comparatively little change in pore structure over the same gel without additive. The dimer, however, greatly increases the pore diameter and pore volume, providing very near the full effect that is desired. The trimer and higher polymers up to 1300 molecular weight are found to provide nearly the same structure. At 3350 molecular weight, the increase in pore volume is in the >1000A diameter sector instead of the desired 200A volume.

The foregoing data thus clearly show that polyethylene glycols, within certain specified molecular weight ranges, can produce substantial increases in pore volumes ranging from about 0.8 cc/g to about 2 cc/g, and higher. Low molecular weight, water-soluble polypropylene glycols and polyethylene amine polymers can also be added to hydrogel during an extension step to produce the desired pore volume effects.

EXAMPLE 4

To show the effects of low molecular weight, water-soluble polypropylene glycols and polyethylene amine polymers, Example 3 was repeated except that these polymers were substituted for the polyethylene glycol polymers. The data which were obtained are presented in Table IV and compared to a sample prepared with the same amount of polyethylene glycol. These data show that these polymers provide even larger increases in pore volume within the 100–275A pore diameter range than similar concentrations of polyethylene glycol added to the hydrogel. Further, the undesirable 1000A pore volume was equally low for the polyethylene amines and only slightly higher, i.e., ~0.2 cc/g, for the polypropylene glycols.

TABLE IV

EFFECT OF MOLECULAR TYPE OF ADDITIVE ON PORE STRUCTURE

| Additive | Mol. Wt. | S.A. | P.V. | P.V.[1] 100–275A dia. | P.V.[1] >1000A dia. |
|---|---|---|---|---|---|
| Polyethylene Glycol | 380–420 | 425 | 1.37 | 0.441 | 0.028 |
| Polypropylene Glycol | 400 | 409 | 2.16 | 0.458 | 0.208 |
| Polypropylene Glycol | 1200 | 439 | 2.16 | 0.472 | 0.283 |
| Triethylenetetramine | 146 | 460 | 1.61 | 0.523 | 0.054 |
| Tetraethylenepentamine | 189 | 504 | 1.71 | 0.513 | 0.067 |

[1]Pore volume measured by mercury injection.

The following data are illustrative of the formation of a catalyst by cogellation, or coprecipitation of the alumina hydrogel with one or more metal hydrogenation components.

EXAMPLE 5

A solution was prepared of 61.7 g. sodium hydroxide in 62 g. water and heated to 212° F. To this were added 40.8 g. alumina trihydrate and 13.1 g. $MoO_3$ which were observed to dissolve in less than five minutes. The combination was diluted with 2660 g. water.

A second solution was prepared of 14.7 g. cobaltous sulfate ($CoSO_4 \cdot 7 H_2O$) and 141.5 g. aluminum sulfate ($Al_2(SO_4)_3 \cdot 14 H_2O$) in 1179 g. water. This was added to solution No. 1 at 100 cc/min. with good mixing at 77° F. The precipitated hydrogel was recovered by filtering and washed three times the sodium aluminate slurry at reslurrying in water and filtering. The washed hydrogel was divided into three equal portions which were blended with 16, 24, and 32 g. polyethylene glycol (300 mol. wt.). The blends were dried at ambient temperature, boken to pass 4 mesh, dried at 248° F, and calcined in air at 1000° F. The pore structures of these materials are indicated by the data in Table V.

TABLE V

6% CoO, 20% $MoO_3$ COGELLED WITH $Al_2O_3$

| Polymer/$Al_2O_3$ | S.A. | P.V. | P.V. 100–275A dia. | P.V. >1000A |
|---|---|---|---|---|
| 1.0 | 360 | 1.18 | 0.422 | 0.139 |
| 1.5 | 375 | 1.48 | 0.484 | 0.184 |
| 2.0 | 396 | 1.82 | 0.514 | 0.322 |

Surface areas for these products are nearly equivalent for these products while pore volume increases with polymer content as for the preceding examples. Pore volume in the preferred 100–275A dia. range is high for all three, but highest for 2 g. polymer/g. $Al_2O_3$. However, this sample also shows the most pore volume in the less desirable >1000A diameter range.

The following example is exemplary of the preparation of a silica-alumina base by the spray drying of a PEG extended alumina hydrogel to form pseudo-boehmite microspheres, which microspheres are suitable for mulling with a wetting agent, extruding, air drying, marumerizing, if desired, treating and impregnating with metals, and then dried and calcined to form catalyst extrudates or spheres of superior pore structure.

EXAMPLE 6

Approximately 10 kg of aluminum sulfate was dissolved in 83.3 kg of deionized $H_2O$, and the solution filtered. A sodium aluminate slurry was prepared by mixing 3.4 kg. of NaOH with 3.3 kg of aluminum trihydrate. The slurry was then cooled and diluted with 166.7 kg of water, and 0.3 kg of tetraethylorthosilicate was added to the aluminum sulfate solution. The aluminate sulfate solution was then added slowly to the sodium alumnate slurry at 50° F. The addition was discontinued at ph = 10. The slurry was then heated to 120° F. and filtered to recover the gel. The gel was reslurried with deionized water and washed until the $Na_2O$ content of the gel was less than 0.1 wt. %, and $SO_4$ less than 3 wt. %.

The washed gel was then mixed with 6.4 kg of polyethylene glycol (ca. 2 weights of PEG/1 weight of $Al_2O_3$) and reslurried with water to provide a slurry containing 5–10 wt. % solids in liquid. The slurry was spray dried. During this operation, the feed rate of the burner was adjusted to maintain a spray dried bottom temperature of 300°–350° F. The product has a particle size range of approximately 50–150 microns (0.002–0.006 inch particle size diameter) and a solids ($Al_2O_3$) content of ca. 30 wt. %. The physical properties of the material are given in Table IV below. The properties were obtained after calcination at 1000° F. for 2 hours in nitrogen and 2 hours in air.

TABLE IV

| Surface Area[1], m²/gm | 485 |
|---|---|
| Pore Volume[2], cc/gm | 1.52 |
| PSD, % PV in[3] | |
| 0–50A | 4.0 |
| 100–200A | 38.7 |
| 150–250A | 32.6 |
| 175–275A | 28.8 |
| 300A+ | 16.3 |
| 350A+ | 10.9 |

[1]S.A. by BET method.
[2]PV by filling pores with nitrogen.
[3]PSD by Adsorptomat.

The physical properties of the microspheres prepared under these conditions have been found quite suitable for preparing highly preferred catalysts, as extrudate, by suitable treatment of the base, and proper impregnation and post-treatment of catalyst, e.g., calcination, steaming and the like. By careful preparation, it is feasible to prepare a catalyst of optimum pore structure, albeit some pore volume and surface area are lost during the required additional preparation steps.

The following example is illustrative of the preparation of an alumina extrudate from spray dried alumina microspheres.

EXAMPLE 7

An approximately 10 gm sample of the spray dried PEG alumina as described in Example 6 was mixed with 5 gm of water and mulled until a thick extrusion paste was formed containing 20 wt. % solids. The extrusion mix was charged to a Carver press, the heart of which is characterized as a tubular extruder where pressure is applied to the extrusion mix by means of a hydraulic ram. A single-hole 1/32-inch die was installed on the side of the tubular extruder near its bottom.

In operation, on application of pressure by the hydraulic ram, a 1/32-inch spaghetti flowed from the die. The pressure gauge indicated that 300 psig was necessry to force the extrusion mix out of the single 1/32-inch die aperture. After extrusion, the material was air dried overnight and washed with isopropanol. The washed extrudates were then calcined for 2 hours in nitrogen at 1000° F. followed by calcination at 1000° F. in air. The properties of these extrudates are given in Table VII, below:

TABLE VII

| Surface Area, m²/gm | 434 |
|---|---|
| Pore Volume, cc/gm | 1.51 |
| PDS, % PV in | |
| 0–50A | 5.3 |
| 150–250A | 25.3 |
| 350A+ | 22.4 |

These data clearly indicate that the alumina can be formed into highly preferred 1/32-inch diameter extrudates by commercial extrusion techniques.

The following demonstrates the impregnation of an alumina extrudate base with hydrogenation components.

EXAMPLE 8

An approximately 3.4 gm portion of the 1/32-inch diameter extrudates as formed in Example 7 by use of the Carver press was impregnated with 6% CoO and 20% $MoO_3$. A 1.1 gm sample of the extrudates was calcined at 1000° F. and yielded 0.85 gm of calcined alumina, indicating 77% $Al_2O_3$ in the sample. To impregnate the 3.4 gm sample, 0.68 gm of $CoCl_2.6H_2O$ and 0.76 gm of phosphomolybdic acid (ca. formula — 20 $MoO_3.2H_3PO_3.48H_2O$) were dissolved in ca. 7 cc of methanol. The solution was imbibed into the pores of the catalyst (incipient wetness) and allowed to dry overnight. After drying at 190° F. for approximately 8 hours the catalyst was then calcined for 2 hours at 1000° F. in air. The physical properties of the catalyst are given in the Table VIII below:

TABLE VIII

| Surface Area, m²/g | 304 |
|---|---|
| Pore Volume, cc/gm | 1.03 |
| PSD, % PV in | |
| 0–50A | 3.8 |
| 150–250A | 30.9 |
| 350A+ | 16.8 |

These data show that some surface area and pore volume was lost as a result of the impregnation, but nonetheless the catalyst is acceptable as regards both of these properties. The pore size diameter (PSD) is clearly suitable, and within the preferred range of pore size diameters for a 1/32-inch catalyst.

It has been demonstrated that simply by drying the gel blended with PEG at a low temperature, i.e., 100°–150° F., the amorphous gel was changed into pseudo-boehmite with the desired pore structure. Having discovered that this phase change occurred, it was then concluded and subsequently established that it would be possible to extract the PEG from the alumina by multiple contacting with a solvent at its reflux temperature. This discovery thus makes it unnecessary to burn out the polymer during the calcination to form the proper pore size diameter. In other words, pursuant to this discovery, it is unnecessary to incorporate burnable materials (fibers, etc.) which are then burned out to form the large pores, as earlier practiced. And, not only can the polymer be removed by extraction, but it can also be recycled. The following example demonstrates recovery of the PEG.

EXAMPLE 9

For demonstrative purposes, two hundred grams of the spray dried PEG powder as produced in Example 6 was added to 500 cc of isopropanol. It was heated with stirring at 170° F. in a flask equipped with a reflux condenser for 1 hour. The sample was filtered and PEG recovered from the isopropanol by boiling off the isopropanol. 62.9 grams of PEG were recovered. This was repeated two more times with 16.5 grams and 6.2 grams of PEG recovered during these extractions. This amounted to 69% recovery of PEG from the alumina. The extracted PEG was utilized in forming a PEG alumina of high quality demonstrating that the extracted PEG can be recycled and reused in the process. The extracted alumina was calcined at 1000° F. for 2 hours in nitrogen and then at 1000° F. for 2 hours in air. The properties of this material are as shown in Table IX below:

TABLE IX

| Material | Extracted $Al_2O_3$ |
|---|---|
| Surface Area, m²/gm | 436 |
| Pore Volume, cc/gm | 1.82 |

These data clearly shown that a high quality $Al_2O_3$ is obtained by extraction of PEG. Moreover, 69% of the PEG was recovered for reuse. It is clear that a greater amount of PEG recovery is feasible, and that much of the PEG was lost due to spray drying at close to 350° F. Spray drying at the lowest possible temperature could improve this recovery. If desirable, the spray drying step can be eliminated and low temperature drying (100–150° F.) employed to improve PEG recovery. The recovered PEG is suited for forming PEG alumina of the desired physical properties.

The following example exemplifies the preparation of a catalyst by marumerization, e.g. the preparation of a 1/24-inch spherical PEG $Al_2O_3$.

EXAMPLE 10

Approximately 100 gm of the spray dried PEG $Al_2O_3$ of Example 6 was mixed with 20 gm of water and mulled to make a thick extrusion paste. The extrusion mix was fed to a Welding Engineer 0.810 extruder (manufactured by Welding Engineer of King of Prussia, Pennsylvania). The screw RPM was maintained at 100 RPM, and the material was extruded through a die containing 24 1/32-inch holes. The land length of the die was ¼-inch, and the die was of a special design wherein the holes were recessed into the die face such that the following edge of the cavity scraped the extrusion mix into the cavity to insure continued feeding to the holes of the die. Three cavities were built into the die, each containing 8 holes. (This type of die is later referred to as a triple cavity die.)

Good quality "green" extrudates were obtained in such extrusion. The green extrudates were dried to 27 wt. % solids whereupon they were fed to a Model Q-230 pilot size Marumerizer, of a type marketed by the Eli Lily Pharmaceutical Co. (who use it to make small spheres of drugs for patent medicines such as "Contact"). The equipment consists of a nonmoving bowl, 230 mm in diameter, which can be fitted with three types of plates: (1) coarse, (2) fine and (3) smooth. The coarse plate has a crosscut grid spacing of 3 mm, whereas the fine plate has a 1.5 mm grid. The plate speed can be varied from 300 to 970 RPM. Batch times ranging from a few minutes to 20 or more minutes can be employed. In this case the fine plate was used with 970 RPM for a batch time of 10 minutes. The spheres formed were approximately 1/24-inch in size.

The 1/24-inch spheres were then subjected to drying for approximately 8 hours followed by calcination for 2 hours in nitrogen at 1000° F. and then 2 hours in air at 1000° F. The properties of these spheres were given in Table X below.

TABLE X

| Surface Area, m²gm | 375 |
|---|---|
| Pore Volume, cc/gm | 1.05 |
| PSD, % PV in | |
| 0–50 A | 6.3 |
| 150–250 A | 31.7 |
| 350 A+ | 12.8 |

The pore size distribution, as will be observed, is close to that for a preferred 1/24-inch sphere (or extrudate), and the pore volume is acceptable.

The following example exemplifies the preparation of of preferred 1/32-inch spherical alumina by marumerization using rapid calcination.

EXAMPLE 11

Seven hundred and seventy-five grams of the spray dried PEG alumina were mulled with 314 grams of water to form a 22% solids extrusion mix, as described in Example 10. The mix was extruded in the 0.810 Welding Engineer extruder with the triple cavity 24-1/32-inch hole die at 50 RPM. The extrudates were then dried to 26% solids. The extrudates were then marumerized with a fine plate for 10 minutes at 970 RPM, and with a smooth plate for 5 minutes at 970 RPM. The smooth plate forms uniform, well rounded spheres from the rough spheres. These spheres were charged directly to a calciner which was heated from room temperature to 1000° F. at a rate of 2° F./min. in nitrogen, at which temperature they were held for 2 hours and then calcined at this temperature for 2 hours in air. This type of treatment is referred to as rapid calcination. The physical properties of the spheres are given in Table XI.

TABLE XI

| | |
|---|---|
| Surface Area, m²/gm | 405 |
| Pore Volume, cc/gm | 1.22 |
| PSD, % PV in | |
| 0–50 A | 2.2 |
| 150–250 A | 35.7 |
| 350 A+ | 8.2 |

These data indicate that the 1/32-inch spheres fall essentially into the preferred region. The important factors exemplified are (1) proper % solids during extrusion, (2) proper drying between extrusion and marumerization, and (3) rapid calcination of the formed spheres.

The following example is exemplary of the preparation of a preferred 1/32-inch spherical PEG alumina by marumerization and steaming.

EXAMPLE 12

Seven hundred and seventy-five grams of the spray dried PEG alumina, as prepared in Example 6, is mulled with 365 gm of water to form an extrusion mix containing 21% solids. The mixture was divided into two batches, one of which was used for the present demonstration.

A 570 gm batch of the mixture was extruded on the Welding Engineer 0.810 extruder using a triple cavity die having a total of 15 aperatures, or holes (five in each cavity), the holes being the size of a No. 72 drill. The extruder was operated at 50 RPM. Following extrusion, the solids were dried to 25% solids and then marumerized on the fine plate for 4 minutes at 970 RPM. The formed spheres were placed in a hexanol bath and heated from 70° F. to 265° F. in 50 minutes and then held at 265° F. for 50 minutes. The bath was then cooled to 130° F. and alcohol decanted from the spheres. The spheres were then vacuum dried overnight to remove most of the hexanol. Finally the spheres were calcined at 1000° F., for 2 hours in a mixture of nitrogen and steam, followed by 2 hours of calcining in a mixture of air and steam. The properties of the alumina spheres are given in Table XII below.

TABLE XII

| | |
|---|---|
| Surface Area, m²/gm | 336 |
| Pore Volume, cc/gm | 1.41 |
| PSD, % PV in | |
| 0–50 A | 4.1 |
| 150–250 A | 26.8 |
| 350 A+ | 29.3 |

These data show that this alumina falls essentially within the preferred region for 1/32-inch extrudates or spheres. This results because of (1) proper forming and drying of the extrudate, (2) washing of the spheres with hexanol which removes PEG and water and (3) steaming of the formed spheres.

The following example demonstrates the preparation of a very active demetallization catalyst from a steamed PEG alumina, as described in Example 12. Alumina spheres were impregnated to form a Co/Mo catalyst.

EXAMPLE 13

A 10 gram sample of alumina base, of spherical shape as described in Example 12, was impregnated by dissolving 1.9 grams of cobalt chloride and 2.1 grams of phosphomolybdic acid in 60 ml of methanol. Excess solvent was employed, and the temperature of the methanol was raised to 120° F. to evaporate off excess methanol. The spheres were then air dried for 8 hours, dried at 190° F. for 8 hours and calcined for 2 hours at 1000° F. in air. The properties of this catalyst are given in Table XIII below.

TABLE XIII

| | |
|---|---|
| Surface Area, m²/gm | 259 |
| Pore Volume, cc/gm | 1.31 |
| PSD, % PV in | |
| 0–50A | 3.0 |
| 150–250A | 26.5 |
| 350A+ | 26.2 |

This catalyst has the desired pole size diameter and pore volume, but as will be observed, the surface area is lower than preferred. This is largely because the starting base was steamed and had a low surface area, and hence the resulting catalyst is also low in surface area. During impregnation some 50–100 m²/gm of surface area was lost. Careful impregnation techniques, however, can produce higher surface area, and suppress loss of pore volume.

Albeit this particular catalyst falls outside of the optimum ranges for surface area for better balance between hydrodesulfurization and demetallization activity, it nonetheless is an excellent demetallization catalyst.

This catalyst was compared against a large pore catalyst made by the ethylene oxide technique described in, e.g., Ser. No. 533,314, supra, representative of a catalyst with excellent balance between hydrodesulfurization and demetallization activity. The characteristics of the "ethylene oxide" catalyst (14–35 mesh granules), a catalyst well within the preferred range of particle sizes, are described in Table XIII-A below:

TABLE XIII-A

| (ETHYLENE OXIDE CATALYST) | |
|---|---|
| Surface Area, m²/gm | 359 |
| Pore Volume, cc/gm | 1.38 |
| PSD, % PV IN | |

TABLE XIII-A-continued (ETHYLENE OXIDE CATALYST)

| | |
|---|---|
| 0–50A | 0 |
| 150–250A | 32.4 |
| 350A+ | −11.0 |

The two catalysts were tested for the hydrodesulfurization and demetallization of Cold Lake crude at 750° F., 2250 psig, 1 V/Hr./V and 6000 SCF/B $H_2$, with the results given in Table XIII-B below:

TABLE XIII-B

| Catalyst | Ethylene Oxide | PEG Catalyst (Steamed Base) |
|---|---|---|
| Relative Activity at 4 Days | | |
| Hydrodesulfurization | 100 | 75 |
| Vanadium Removal | 100 | 132 |

These results show that the PEG catalyst made from the steamed base is an excellent demetallization catalyst because of its large pore size, albeit it is deficient somewhat in hydrodesulfurization activity.

The following example exemplifies the preparation of a preferred 1/32-inch diameter spherical catalyst.

EXAMPLE 14

One hundred seventy five grams of spray dried PEG alumina were mulled with 60 grams of water to form an extrusion paste containing 23% solids. The mix was extruded in the Welding Engineer 0.810 extruder using the triple cavity die with 15 No. 72 drill holes. The extruder was operated at 50 RPM. After extrusion the material was dried to 25% solids, and the extrudates were then marumerized on a fine plate at 970 RPM for 5–8 minutes. The spheres were then smoothed by a smooth plate at 970 RPM for 1–2 minutes. The spheres were heated in hexanol at 265° F. for 1 hour. After drying overnight, the spheres were calcined for 2 hours in nitrogen and 2 hours in air at 1000° F.

Ten grams of the calcined base was then impregnated with a solution made by dissolving 2 grams of cobalt chloride and 2.2 grams of phosphomolybdic acid in 60 ml of methanol. The excess methanol was removed from the base by evaporation to dryness at 140° F. over a period of 8 hours. The base was subsequently dried at 190° F. for 8 hours and calcined in air at 1000° F. for 2 hours. The properties of the base and catalyst are given in Table XIV below.

TABLE XIV

| Material | Base | Catalyst |
|---|---|---|
| Surface Area, m²/gm | 407 | 344 |
| Pore Volume, cc/gm | 1.27 | 1.23 |
| PD, A | 125 | 142 |

These and other data have shown that pore size distribution, formed pursuant to this invention, almost always fall within the preferred regions, with further optimization feasible by careful control techniques. Consequently, in this example, and the remaining examples, this property is described in terms of average pore diameters $(4 \times 10^4)$ (PV/SA). It is apparent that some surface area and pore volume are lost during the impregnation. In forming these catalysts, therefore, considerable care must be taken to properly form the base with good surface area (375–425 m³/gm) and good pore volume (1.3–1.5 cc/gm) for these properties are easily lost during impregnation with metal hydrogenation components. The surface area should be within the region of 340+ m²/gm after impregnation. Care must also be taken to avoid pore volume loss during impregnation to insure a pore volume of 1.2 or 1.3 cc/gm or higher. This catalyst as shown by the physical properties falls essentially into the preferred region for 1/32-inch spheres or extrudates. When this catalyst was tested for hydrodesulfurization and demetallization of Cold Lake crude, good activity was shown for both of these reactions. Improved impregnation, and better dispersion of the Co/Mo during the impregnation step, causes increased hydrodesulfurization and demetallization activity, as well as better balance between hydrodesulfurization and demetallization activity.

The key to forming high quality extrudates and spheres by the extrusion, or extrusion and marumerization, is to first from high quality spray dried granular alumina, or alumina powder. Preferably, as previously exemplified, the alumina powder should contain a 2:1 weight ratio of polymer: alumina and have a solids content approaching 30 weight percent. Solids content is controlled primarily by the polymer content and spray drier temperature. If less polymer is used, then lower spray drier temperatures will be required to yield 30 weight percent solids. Higher solids concentrations, e.g. 35% and higher, create some difficulties in forming spheres especially spheres of 1/32-inch diameter and smaller. If higher weight percent solids are obtained, smaller size spheres of acceptable quality can be formed if the spray dried powder is first extracted with isopropanol to remove polymer. The examples described in Example 15 below, however, utilized 30 wt. % solids and did not require this type of pretreatment.

EXAMPLE 15

Spray dried powder, 30 weight percent solids, was mixed with varying quantities of water to make extrusion mixes with solids content varying from 23–25% solids. These materials were then extruded at conditions shown in the Table XV below. The extrudates were air dried to solids contents varying from 25 to 29%, and the materials were then marumerized at the conditions shown in the table.

TABLE XV

| Run | 1 | 2 | 3 | 4 | 5 | 6 |
|---|---|---|---|---|---|---|
| Extrusion Mix, Wt. % Solids | 23 | 23 | 23 | 25 | 25 | 25 |
| Extrusion Conditions | | | | | | |
| Die Hole Size, In. | 0.042 | 0.031 | 0.025 | 0.031 | 0.025 | 0.025 |
| No. of Holes[1] | 3 | 24 | 24 | 24 | 24 | 24 |
| Land Length of Die, Inches | 0.5 | 0.25 | 0.25 | 0.25 | 0.25 | 0.25 |
| RPM | 200 | 100 | 75 | 100 | 100 | 100 |
| Extrudates, | | | | | | |

TABLE XV-continued

| Run | 1 | 2 | 3 | 4 | 5 | 6 |
|---|---|---|---|---|---|---|
| Dried to % Solids | 25 | 25 | 25 | 27 | 27 | 29 |
| Marumerizer Conditions | | | | | | |
| Plate Type | Coarse | Fine | Fine | Fine | Fine | Fine |
| Plate Speed, RPM | | | | 970 | | |
| Batch Time, Min. | 5 | 5 | 5 | 10 | 10 | 10 |

(1) 24 hole-die was triple cavity die

The results are as shown in FIG. 3. The data points shown in solid form represent the six samples described in the table. Other data points are given on the figure which described similar preparations. The data show that the ratio of sphere diameter to extrudate diameter decrease as the wt. % solids of the extrudates fed to the marumerizer increases. At 29% solids the ratio is approximately 1.1:1 i.e. the spheres are of approximately 10% larger diameter than that of the extrudate.

It is clear that the controlling factor in forming spheres is the solids content of the material fed to the marumerizer. In addition, the change of the solids content in drying the extrudates before marumerization is also critical. As shown, the change should not exceed 5%, preferably 3%, and most preferably 2%. Excessive drying will not form good spheres, and drying between the extrusion and marumerization steps is required for the formation of high quality spheres.

In general summation, a controlling factor in the process also, as earlier suggested, is the wt. % solids of the extrusion mix. Below 20% solids the mix is too wet to form high quality extrudates, especially extrudates of good strength. The mix should comprise at least 20 wt. % solids, and preferably about 21–23 wt. % solids. As wt. % solids of the extrusion mix is increased above about 25 wt. %, extrusion becomes more difficult, and even at about 25 wt. % solids it is preferred to operate the extruder with the triple cavity die at low RPM to avoid excessive torque.

In terms of marumerization, as the solids content of the extrudates is increased above about 27–29 wt. % solids the batch time required to form good spheres increases excessively and becomes prohibitive. It was also found that increasing the plate speeds of the marumerizers reduces the batch time, and speeds of about 970 RPM prove most satisfactory.

On balance, the operating conditions for forming spheres from polumer spray dried powder are: (a) mull the alumina powder with water to form at least about a 20%, or 22% solids extrusion mix, preferably a spray dried powder containing about 30 wt. % solids; (b) extrude the mulled alumina powder through a 1/40 inch die if 1/32-inch spheres are desired (the die size should be adjusted to obtain desired sphere size); (c) air dry the extrudates to about 26 wt. % solids; (d) marumerize the extrudates with a fine plate for about 10–12 minutes at about 970 RPM; and (e) smooth the spheres by marumerizing spheres on smooth plate for about 1–3 minutes at about 970 RPM.

The following data exemplifies the post treatment of marumerized spheres to prevent pore volume loss. Once the sphere (or extrudate) is formed it is important to maintain pore volume during the calcination treatment.

EXAMPLE 16

Four samples of marumerized spheres (ca. 1/32-inch diameter) were prepared by procedures described in Example 15. These samples were then treated in the following manner as shown in the Table XVI below.

TABLE XVI

| Treatment | Dried at 190° F. 2 Hr. at 1000° F. in $N_2$ 2 Hr. at 1000° F. in Air | Rapid Heat up to 1000° F. in $N_2$ (>2° F./min.) 2 Hr. at 1000° F. in $N_2$ 2 Hr. at 1000° F. in Air | Rapid Heat up to 1000° F. in $N_{2/Steam}$ (>2° F./min.) 2 Hr. at 1000° F. in $N_2$/Steam 2 Hr. at 1000° F. in Air/Stream | Heat in Hexanol (45 min.) to 265° F. Hold 1 Hr. Rapid heat up to 1000° F. in $N_2$ (>2° F./min.) 2 Hr. at 1000° F. in $N_2$ 2 hr. at 1000° F. in Air |
|---|---|---|---|---|
| Surface Area m²/gm | 421 | 405 | 336 | 386 |
| Pore Volume, cc/gm | 1.08 | 1.22 | 1.41 | 1.36 |
| PD, A | 103 | 121 | 168 | 141 |

By first drying the spheres at 190° F. (slow heat up) and then calcining for 2 hours at 1000° F. in $N_2$ and 2 hrs. at 1000° F. in air a severe loss in pore volume occurs (1.03 cc/gm). It is desired to have as much pore volume available as possible to allow for some reduction during impregnation. Also it is desirable to have at least 375 m²/gm surface area available to allow for 50–75 m²/gm surface area loss during impregnation. At the same time it is desirable to have at least 1.3 cc/gm pore volume prior to impregnation. In the second column by avoiding the 190° F. drying and heating the sample up to 1000° F. in $N_2$ at a rate >2° F./min. some improvement in pore volume retention was obtained (1.22 cc/gm.). In the third column a similar treatment was used except steam was added along with the nitrogen and air. In this run, good retention of pore volume occurred (1.4 cc/gm). However, due to the steaming the surface area was lower than desired (356 m²/gm).

However, as noted in an earlier example, when impregnated this catalyst had good demetallization activity. Finally the last column shows that by first heating the solids in hexanol followed by the rapid calcination technique described in column 2, a good quality sphere with good surface area (386 m²/gm) and pore volume (1.36 cc/gm) was obtained.

The usual procedure for impregnating alumina bases is to first expose the calcined base to water vapor to prevent excess heat evolution when the base is exposed to the impregnating medium. In most cases the metal bearing salt (e.g., ammonium molybdate) is dissolved in sufficient water so that the catalyst will imbibe all of the solution into its pores (incipient wetness). The impregnated catalyst is then evaporated to dryness, further dried at 190° F. for 6 hrs. and calcined at 1000° F. for 2 hrs. Next, the second metal bearing compound (e.g., cobalt chloride) is dissolved in a similar amount of water and imbibed onto the catalyst. The drying and calcination steps are then repeated. In some cases simultaneous impregnation is possible by the use of phosphomolybdic acid and cobalt chloride. Water can be used as a solvent or organic solvents such as methanol can be used in place of water.

The better procedure for impregnating the aluminas formed pursuant to this invention is to use an excess of solvent. The preferred procedure for impregnation of the alumina base is to use an excess of solvent, three times (3X) that calculated pursuant to the formula:

Volume of solvent to be used = (PV of base, cc/gm) (gm $Al_2O_3$) X Factor (for incipient wetness)

the Factors for incipient wetness being defined for different frequently used solvents, as in Table XII-A, to wit:

TABLE XVII-A

| Solvent | Factor |
|---|---|
| Water | 1.7 |
| Methanol | 1.6 |
| Isopropanol | 1.5 |
| Hexanol | 1.4 |

The following comparative data is illustrative of the impregnation of marumerized 1/32 inch spheres prepared by the process of this invention.

EXAMPLE 17

In a preferred type of impregnation, sufficient cobalt chloride and phosphomolybdic acid is dissolved in alcohol (or cobalt chloride and ammonium molybdate in water) to make 4–6% CoO and 15–20% $MoO_3$, based on the weight of the catalyst. The volume of solvent used was 3 times that calculated by the above formula. The base was exposed to an atmosphere saturated with water, and the solution was poured onto the base and allowed to stand for 24–48 hours. The base was then exposed to air and the solvent allowed to evaporate. The base was then dried in air for 8 hours, then dried at 190° F. for 8 hours, and then calcined in air at 1000° F. for 2 hours.

Table XVII-B shows the advantages for impregnation using this procedure, to wit: In Columns 2 and 3 of the table there are shown the catalyst properties for catalysts impregnated by the incipient wetness technique for methanol and water solvents, respectively. The alumina shown in Column 1 was used as the base. The data show that severe pore volume loss occurred in both cases.

In Column 5 there are shown the properties of a catalyst prepared by methanol impregnation of an alumina shown in Column 4 using excess solvent. The amount of solvent used was calculated by the formula shown in Table XVII-A. The resulting catalyst had good surface area (344 m²/gm) and pore volume (1.23 cc/gm).

In Colume 7 is shown a catalyst prepared by using a methanol impregnation employing excess solvent as described by the formula in Table XVII-A. The alumina base shown in Column 6 was used for this impregnation. The resulting catalyst had good pore volume (1.31 cc/gm).

In Columns 8 and 9 are shown properties of catalysts prepared similar to that of the catalysts shown in Column 7 except extended soaking of the base in the impregnating solution was allowed to permit uniform impregnation of all of the pores. Good pore volume retention resulted in both cases and is especially significant for the water solvent case.

TABLE XVII-B

| Material | Alumina[1] | Catalyst[2] | Catalyst[3] | Alumina[4] | Catalyst[5] | Alumina[6] | Catalyst[7] | Catalyst[8] | Catalyst[9] |
|---|---|---|---|---|---|---|---|---|---|
| Mo Source | — | PMA | $NH_4$ Moly | — | PMA | — | PMA | PMA | $NH_4$ Moly |
| Solvent | — | $CH_3OH$ | $H_2O$ | — | $CH_3OH$ | — | $CH_3OH$ | $CH_3OH$ | $H_2O$ |
| Impregnation Type | — | Incipient Wetness | 2-Stage Incipient Wetness | — | Excess Solv. | — | Excess Solv. | Excess Solv., 48 Hrs. | Excess Solv., 48 Hrs. |
| Surface Area, m²/gm[10] | 405 | 325 | 314 | 407 | 344 | 336 | 259 | 283 | 293 |
| Pore Volume, cc/gm[10] | 1.22 | 0.78 | 0.91 | 1.27 | 1.23 | 1.41 | 1.31 | 1.11 | 0.98 |
| PD, A | 121 | 96 | 116 | 125 | 142 | 168 | 202 | 157 | 134 |

Notes:
[1] Prepared by rapid calcination technique.
[2] Used $CoCl_2 \cdot 6H_2O$ and phosphomolybdic acid dissolved in methanol and imbibed into pores.
[3] Two stage process; ammonium molybdate dissolved in $H_2O$ and imbibed, calcined, followed by imbibing $CoCl_2 \cdot 6H_2O$ dissolved in $H_2O$, calcined.
[4] Prepared by soak in hot $C_6$ alcohol followed by rapid calcination.
[5] Cobalt chloride and PMA dissolved in 3 times solvent needed for incipient wetness impregnation, Co/Mo adsorbed out of solution, evaporated to dryness.
[6] Prepared by soak in hot $C_6$ alcohol followed by steaming.
[7] Same as (5).
[8] Same as (5) except allowed to soak for 48 hrs. before evaporating to dryness.
[9] Same as (8) except $NH_4$ moly and $CoCl_2 \cdot 6H_2O$ dissolved in excess $H_2O$, soaked for 48 hrs., then evaporated to dryness.
[10] After evaporating to dryness, drying for 6 hrs. at 190° F. + calcining at 1000° F. for 2 hrs.; same for all catalysts.

The normal procedure for preparing catalysts is to prepare a calcined alumina and then impregnate this material with a hydrogenation component, or components, e.g. cobalt and molybdenum. As discussed and exemplified, care must be taken to avoid pore volume loss by this technique. An alternate procedure that circumvents this terminal impregnation is to impregnate the hydrogel. The following example presents preparations which illustrate this technique.

EXAMPLE 18

Basically, a hydrogel (4–15% $Al_2O_3$ in $H_2O$) was admixed with PEG and the cobalt and molybdenum sources. In one case the mix was buffered with tetra methyl ammonium hydroxide to maintain a pH in excess of 10. In addition, several sources of cobalt and molybdenum were utilized. After impregnation, the hydrogels were dried to 20–23% solids at a low temperature (not in excess of 200° F.). In two cases the dried solids were extracted with isopropanol at 170° F. to remove PEG. [Some Co and Mo were extracted but this can be minimized by using higher molecular weight alcohols (e.g. $C_4$ and $C_5$).] Three of the samples were then extruded, while one remained in granular form. All materials were calcined as prescribed by Table XVIII.

As Table XVIII shows, sample A had a low pore volume. This resulted because of the use of chloride, which has been found to reduce pore volume. Sample B which used a nitrate gave a high pore volume of 1.03 cc/gm as did Sample C which employed the acetate. Sample D, although the nitrate was employed, showed a further increase in pore volume (1.08 cc/gm). This is attributed to the maintenance of a pH in excess of 10 during the hydrogel impregnation step.

pore size distribution as determined by the Aminco Adsorptomat showed 48.3% of the total pore volume in pores 150 to 250A diameter while only 4.9% of the total PV in pores greater than 350A diameter and 0.05% in pores less than 50A diameter. These data thus show that PEG aluminas approaching the more preferred specification can be prepared by extension of conventional alumina with polyethylene glycols.

It is apparent that various modifications and changes can be made without departing the spirit and scope of the present invention.

Pore size distributions, as percent of total pore volume, for purpose of the present invention are measured by nitrogen adsorption wherein nitrogen is adsorbed at various pressures using the Aminco Adsorptomat Cat. No. 4–4680, and multiple sample accessory Cat. No. 4–4685. The detailed procedure is described in the Aminco Instruction Manual No. 861-A furnished with the instrument. A description of the Absorptomat prototype instrument and procedure is given in Analytical Chemistry, Vol. 32, page 532, April, 1960.

An outline of the procedure is given here, including sample preparation.

From 0.2 to 1.0 g of sample is used and the isotherm is run in the absorption mode only. All samples are placed on the preconditioner before analysis where they are out-gassed and dried at 190° C under vacuum ($10^{-5}$ Torr) for 5 hours. After pretreatment, the weighed sample is charged to the Absorptomat and pumped down to $10^{-5}$ Torr. At this point, the instrument is set in the automatic adsorption mode to charge

TABLE XVIII

| Catalyst | A | B | C | D |
|---|---|---|---|---|
| Hydrogel Type | 4% $Al_2O_3/H_2O$ | 4% $Al_2O_3/H_2O$ | 6.7% $Al_2O_3/H_2O$ | 14.6% $Al_2O_3/H_2O$ |
| Hydrogel, gm | 2000 | 2000 | 1349 | 1370 |
| PEG, gm | 126 | 126 | 144 | 200 |
| Cobalt | 13.1 gm Cobalt Chloride | 16 gm Cobalt Nitrate | 25.9 gm Cobalt Acetate | 63.0 gm Cobalt Nitrate |
| Molybdenum | 21.0 gm PMA[2] | 21 gm PMA[2] | 31.8 gm Amm. Moly. | 73.6 gm PMA[2] |
| pH of Impregnation | — | — | — | >10 by adding $N(CH_3)_4OH$ |
| % Solids Dried to | 30 | 30 | 20 | 33 |
| Extraction of PEG | 1 hr. at 170° F. with Isopropanol | 1 hr. at 170° F. with Isopropanol | No | No |
| % Solids for Extrusion | 32[1] | 31[1] | 20 | Not Extruded |
| Calcination | | | 2 hrs. at 1000° F. $N_2$ 2 hrs. at 1000° F. air | |
| Properties of Catalyst | | | | |
| Surface Area, $m^2$gm | 364 | 368 | 344 | 345 |
| Pore Volume, cc/gm | 0.54 | 1.03 | 1.03 | 1.08 |

[1]Water added to extracted and dried solids.
[2]Phosphomolybdic acid.

EXAMPLE 19

A solution of 54.4 g NaOH in 53.3 g water was prepared and heated to 212° F. To this solution was added 40.8 g alumina trihydrate (Alcoa C-33 alumina). After the alumina dissolved, the solution was diluted with 2259 g water and 408 g methanol and chilled to +14° F. A second solution of 384 g aluminum sulfate ($Al_2(SO_4)_3 \cdot 14H_2O$) in 3200 g water was prepared. A portion (1165 g) of solution No. 2 was added to solution No. 1 at about 100 cc/min with good mixing keeping the temperature of the mixture at 14° F. The mixture was filtered, the hydrogel cake reslurried in water and refiltered twice to remove $Na_2SO_4$, and a portion of the washed hydrogel blended with 1.5 g polyethylene glycol (300 mol. wt.) per gram $Al_2O_3$. The product was dried at ambient temperature, broken to granules, and calcined at 1000° F. Analysis of this product showed 355 $m^2$/g surface area and 1.40 cc/g pore volume. Its a standard volume of gas to the catalyst. This is done by charging a predetermined number of volumes as doses and then allowing time for absorption of the nitrogen to reach equilibrium pressure. The pressure is measured in terms of its ratio to the saturation pressure of boiling liquid nitrogen. Three doses are injected and 8 minutes allowed for equilibration of each measured relative pressure. The dosing and equilibration are continued until a pressure ratio of 0.97 is exceeded and maintained for 15 minutes. The run is then automatically terminated.

The data obtained with the dead space factor for the sample, the vapor pressure of the liquid nitrogen bath, and the sample weight are sent to a digital computer which calculates the volume points of the isotherm, the BET area, and the pore size distribution of the Barrett, Joyner, and Halenda method. [Barrett, Joyner, and Halenda, J. Am. Chem. Soc. 73, p. 373.] It is believed that the Barrett, Joyner, and Halenda method is as complete a treatement as can be obtained, based on the assumptions of cylindrical pores and the validity of the Kelvin equation.

In some instances, in obtaining specific data, pore volume in greater than 100A diameter pores were measured by mercury injection using a Micromeritics Instrument Co. 50,000 lb. Model Porisimeter. Increments of pore volume were observed at increasing pressure and related to pores being intruded by the equation:

$$PD = -3\sigma \cos \theta$$

where P is the applied pressure, D the diameter of the pore, $\sigma$ the surface tension of mercury, and $\theta$ the contact angle between mercury and the material forming the pore opening. The surface tension of mercury ($\sigma$) was taken to be 474 dynes/cm and the contact angle ($\theta$) as 140°. Such specific measurements provide reasonable correlation with nitrogen absorption methods.

Having described the invention, what is claimed is:

1. In a process for preparing a catalyst from a Group VI-B or Group VIII metal, or both, composited with alumina by precipitation of an alumina hydrogel from a solution which contains a hydrous form of alumina and a compound having an anion that is soluble in an alkaline solution and forms and aluminum salt, the improvement comprising
precipitating the hydrogel of alumina at temperatures ranging from about 15° F. to about 120° F. from the solution, which contains alumina in concentration ranging from about 1 to about 5 percent, based on the weight of solution, at pH ranging from about 8 to about 12,
separating the alumina hydrogel from the solution,
contacting the alumina hydrogel with a solution of a water-soluble polymer containing from about 2 to about 24 monomer units from the group consisting of (a) polyethylene glycols, (b) polypropylene glycols, and (c) polyethylene amines sufficient to absorb the polymer into the pores of the alumina hydrogel, displacing water from the pores until the weight rates of polmer:alumina within the hydrogel ranges from about 0.5:1 to about 4:1,
drying the polymer containing alumina hydrogel,
contacting the dried polymer containing alumina hydrogel with a solvent to extract and separate the polymer therefrom,
drying, and
calcining the hydrogel to form gamma alumina characterized as comprising,
when the catalyst is of size ranging from about 1/50 inch up to 1/25 inch average particle size diameter, at least about 15 percent of its total pore volume of absolute diameter within the range of about 150A to about 250A; when the catalyst is of size ranging from about 1/25 inch to about ⅛ inch average particle size diameter, at least about 15 percent of its total pore volume of absolute diameter within the range of about 175A to about 275A; wherein, in each of these catalysts of differing ranges of particle size distributions, the pore volumes resultant from pores of 50° A, and smaller, and minimized; the surface areas and pores volumes of the catalysts being interrelated with particle size, and pore size distributions, surface area ranging at least about 200 m²/g to about 600 m²/g with pore volumes ranging from about 0.8 to about 3.0 cc/g (B.E.T.).

2. The process of claim 1 wherein the alumina hydrogel is precipitated by combining solutions (a) a first of which contains an alkali metal aluminate and (b) a second of which contains a strong mineral acid or an aluminum salt of a strong mineral acid, the anion portion of which is soluble in the alkaline solution.

3. The process of claim 2 wherein silica is added to the second solution.

4. The process of claim 1 wherein the temperature of precipitation ranges from about 32° F. to about 70° F.

5. The process of claim 1 wherein the concentration of alumina contained within the solution from which the hydrogel is preciptated ranges from about 2 to about 3 percent, based on the weight of the solution.

6. The process of claim 1 wherein the pH of the solution from which the hydrogel is precipitated ranges from about 9 to about 10.

7. The process of claim 1 wherein the precipitated alumina hydrogel is washed at ambient temperature.

8. The process of claim 1 wherein the hydrogel is wased at temperatures ranging from about 70° F. to about 120° F.

9. The process of claim 1 wherein the water-soluble polymer contains from about 4 to about 8 monomer units in the total molecule.

10. The process of claim 1 wherein the polymer displaces water from the pores of the alumina hydrogel until the weight ratio of polymer:alumina within the hydrogel ranges from about 1:1 to about 2:1.

11. The process of claim 1 wherein the dried polymer containing alumina hydrogel is extracted with a solvent at temperatures ranging from about 140° F. to about 285° F.

12. The process of claim 11 wherein the temperature of extraction is at or near the boiling temperature of the solvent.

13. The process of claim 12 wherein the extraction is conducted by countercurrent extraction of the alumina hydrogel with the hot solvent.

14. The process of claim 11 wherein the catalyst after drying and calcining is characterized as comprising, when the catalyst is of size ranging from about 1/50 inch up to 1/25 inch average particle size diameter, at least about 20 percent of its total pore volume of absolute diameter within the range of about 150A to about 250A; when the catalyst is of size ranging from abour 1/25 inch to about ⅛ inch average particle size diameter, at least about 20 percent of its total pore volume of absolute diameter within the range of about 175A to about 275A; the surface areas and pore volumes of the catalysts being interrelated with particle size, and pore size distributions, surface areas ranging at least about 250 m²/g to about 450 m²/g, with pore volumes ranging from about 1.1 to about 2.3 cc/g (B.E.T.).

15. The process of claim 11 wherein the catalyst after drying and calcining is characterized as comprising, when the catalyst is of size ranging from about 1/50 inch up to 1/25 inch average particle size diameter, at least about 45 percent, of its total pore volume of absolute diameter within the range of about 150Å to about 250A; when the alumina is of size ranging from 1/25 inch to about ⅛ inch average particle size diameter, at least about 30 percent, of its total pore volume of absolute diameter within the range of about 175A to about 275A; the surface areas and pore volumes of the catalysts being interrelated with particle size, and pore size distributions, surface areas ranging at least about 250 m²/g to about 450 m²/g, with pore volumes ranging from about 1.1 to about 2.3 cc/g (B.E.T.).

16. The process of claim 11 wherein the catalyst is characterized as follows:

| Distribution of Pore Diameters | |
|---|---|
| 1/50 up to 1/25" | |
| 0–50A | <10% |
| 150–250A | <15% |
| 350A+ | <35% |
| Pore Volume, cc/g | 1.1–1.7 |
| Surface Area, m²/g | 320–475 |
| 1/25 up to 1/8" | |
| 0–50A | <5% |
| 175–275A | >15% |
| 350A+ | <40% |
| Pore Volume, cc/g | 1.3–1.9 |
| Surface Area, m²g | 340–500 |

17. The process of claim 11 wherein the catalyst is characterized as follows:

| Distribution of Pore Diameters | |
|---|---|
| 1/50 up to 1/25" | |
| 0–50A | <5% |
| 150–250A | >20% |
| 350A+ | <30% |
| Pore Volume, cc/g | 1.3–1.9 |
| Surface Area, m²/g | 340–575 |
| 1/25 up to 1/8" | |
| 0–50A | <4% |
| 175–275A | >20% |
| 350A+ | <35% |
| Pore Volume, cc/g | 1.5–2.1 |
| Surface Area, m²g | 350–600 |

18. The process of claim 11 wherein the catalyst is characterized as follows:

| Distribution of Pore Diameters | |
|---|---|
| 1/50 up to 1/25" | |
| 0–50A | <1% |
| 150–250A | >45% |
| 350A+ | <7% |
| Pore Volume, cc/g | 1.5–2.1 |
| Surface Area, m²/g | 360–600 |
| 1/25 up to 1/8" | |
| 0–50A | <3% |
| 275A | >30% |
| 350A+ | <25% |
| Pore Volume, cc/g | 1.8–2.3 |
| Surface Area, m²g | 370–650 |

19. In a process for preparing a catalyst from a Group VI-B or Group VIII metal, or both, composited with alumina by precipitation of an alumina hydrogel from a solution which contains a hydrous form of alumina and a compound having an anion that is soluble in an alkaline solution and forms an aluminum salt,
the improvement comprising
precipitating the hydrogel of alumina at temperatures ranging from about 15° F. to about 120° F. from the solution, which contains alumina in concentration ranging from about 1 to about 5 percent, based on the weight of solution, at pH ranging from about 8 to about 12,
separating the alumina hydrogel from the solution,
contacting the alumina hydrogel with a solution of a water-soluble polymer containing from about 2 to about 24 monomer units from the group consisting of (a) polyethylene glycols; (b) polypropylene glycols, and (c) polyethylene amines sufficient to absorb the polymer into the pores of the alumina hydrogel, displacing water from the pores until the weight ratio of polymer:alumina within the hydrogel ranges from about 0.5:1 to about 4:1.
containing the alumina hydrogel with a solution containing a compound of a Group VI-B or Group VIII metal, or both, which is absorbed into the hydrogel,
drying the polymer and cation containing hydrogel,
contacting the dried polymer and cation containing hydrogel with a solvent to extract and separate the polymer therefrom, the solvent being insufficient to extract any substantial amount of the cation from the hydrogel,
drying, and
calcining the hydrogel to form a catalyst characterized as comprising when the catalyst is of size ranging from about 1/50 inch up to 1/25 inch average particle size diameter, at least about 15 percent of its total pore volume of absolute diameter within the range of about 150A to about 250A; when the catalyst is of size ranging from about 1/25 inch to about ⅛ inch average particle size diameter, at least about 15 percent of its total pore volume of absolute diameter within the range of about 175A to about 275A; wherein, in each of these catalysts of differing ranges of particle size distributions, the pore volumes resultant from pores of 50A, and smaller, are minimized; the surface areas and pore volumes of the catalyst being interrelated with particle size, and pore size distributions, surface areas ranging at least about 200 m²/g to about 60 m²/g with pore volumes ranging from about 0.8 to about 3.0 cc/g (B.E.T.).

20. The process of claim 19 wherein the catalyst produced is one comprising, when the catalyst is of size ranging from about 1/50 inch up to 1/25 inch average particle size diameter, at least about 20 percent of its total pore volume of absolute diameter within the range of about 150A to about 250A; when the catalyst is of size ranging from about 1/25 inch to about ⅛ inch average particle size diameter, at least about 20 percent of its total pore volume of absolute diameter within the range of about 175A to about 275A; the surface areas and pore volumes of the catalyst being interrelated with particle size, and pore size distributions, surface ares ranging at least about 250 m²/g to about 450 m²/g, with pore volumes ranging from about 1.1 to about 2.3 cc/g (B.E.T.).

21. The process of claim 19 wherein the catalyst produced is one comprising, when the catalyst is of size ranging from about 1/50 inch up to 1/25 inch average particle size diameter, at least about 45 percent, of its total pore volume of absolute diameter within the range of about 150A to about 250A; when the catalyst is of size ranging from about 1/25 inch to about ⅛ inch average particle size diameter, at least about 30 percent, of its total pore volume of absolute diameter within the range of about 175A to about 275A; the surface areas and pore volumes of the catalyst being interrelated with particle size, and pore size distributions, surface areas ranging at least about 250 m²/g to about 450 m²/g, with pore volumes ranging from about 1.1 to about 2.3 cc/g (B.E.T.).

22. The process of claim 19 wherein the catalyst is characterized as follows:

| Distribution of Pore Diameters | |
|---|---|
| 1/50 up to 1/25" | |
| 0–50A | <10% |
| 150–250A | >15% |
| 350A+ | <35% |
| Pore Volume, cc/g | 1.1–1.7 |
| Surface Area, m²/g | 320–475 |
| 1/25 up to 1/8" | |
| 0–50A | <5% |
| 175–275A | >15% |
| 350A+ | <40% |
| Pore Volume, cc/g | 1.3–1.9 |
| Surface Area, m²/g | 340–500 |

23. The process of claim 19 wherein the catalyst is characterized as follows:

| Distribution of Pore Diameters | |
|---|---|
| 1/50 up to 1/25" | |
| 0–50A | <5% |
| 150–250A | >20% |
| 350A+ | <30% |
| Pore Volume, cc/g | 1.3–1.9 |
| Surface Area, m²/g | 340–575 |
| 1/25 up to 1/8" | |
| 0–50A | <4% |
| 175–275A | >20% |
| 350A+ | <35% |
| Pore Volume, cc/g | 1.5–2.1 |
| Surface Area, m²g | 350–600 |

24. The process of claim 19 wherein the catalyst is characterized as follows:

| Distribution of Pore Diameters | |
|---|---|
| 1/50 up to 1/25" | |
| 0–50A | <1% |
| 150–250A | >45% |
| 350A+ | <7% |
| Pore Volume, cc/g | 1.5–2.1 |
| Surface Area, m²/g | 360–600 |
| 1/25 up to 1/8" | |
| 0–50A | <3% |
| 175–275A | >30% |
| 350A | <25% |
| Pore Volume, cc/g | 1.8–2.3 |
| Surface Area, m²g | 370–650 |

\* \* \* \* \*